(12) United States Patent
Bongard

(10) Patent No.: US 10,553,940 B1
(45) Date of Patent: Feb. 4, 2020

(54) ANTENNA ARRAY WITH INDEPENDENTLY ROTATED RADIATING ELEMENTS

(71) Applicant: VIASAT, INC., Carlsbad, CA (US)

(72) Inventor: Frederic Bongard, Pully (CH)

(73) Assignee: VIASAT, INC., Carlsbad, CA (US)

(*) Notice: Subject to any disclaimer, the term of this patent is extended or adjusted under 35 U.S.C. 154(b) by 0 days.

(21) Appl. No.: 16/118,094

(22) Filed: Aug. 30, 2018

(51) Int. Cl.
*H01Q 1/38* (2006.01)
*H01Q 1/52* (2006.01)
*H04W 16/28* (2009.01)
*H01Q 21/00* (2006.01)
*H01Q 3/36* (2006.01)

(52) U.S. Cl.
CPC .............. *H01Q 1/523* (2013.01); *H01Q 1/38* (2013.01); *H01Q 3/36* (2013.01); *H01Q 21/0025* (2013.01); *H04W 16/28* (2013.01)

(58) Field of Classification Search
CPC .. H01Q 1/52; H01Q 1/38; H01Q 3/36; H01Q 21/00
USPC ........................................................ 343/893
See application file for complete search history.

(56) References Cited

U.S. PATENT DOCUMENTS

| | | | |
|---|---|---|---|
| 3,825,932 A | 7/1974 | Hockham | |
| 6,154,183 A | 11/2000 | Wolf | |
| 6,317,094 B1 | 11/2001 | Wu et al. | |
| 6,377,217 B1 | 4/2002 | Zhu et al. | |
| 6,670,931 B2 | 12/2003 | O'Connell | |
| 7,307,596 B1 | 12/2007 | West | |
| 7,339,520 B2 | 3/2008 | Chang et al. | |
| 8,085,209 B2 | 12/2011 | Llorens Del Rio et al. | |
| 8,659,494 B2 | 2/2014 | Bellows | |
| 9,041,074 B2 | 5/2015 | Hong et al. | |
| 9,231,311 B2 | 1/2016 | Tiezzi et al. | |
| 9,653,801 B2 | 5/2017 | Milroy | |
| 9,755,306 B1 | 9/2017 | Ogilvie | |
| 2003/0008654 A9 | 1/2003 | Senarath et al. | |

(Continued)

FOREIGN PATENT DOCUMENTS

| | | |
|---|---|---|
| EP | 2337152 | 6/2011 |
| EP | 3032648 | 6/2016 |

(Continued)

OTHER PUBLICATIONS

Ghasemi, et al: "Beam Steering Slotted Waveguide Antenna Using Rotating Dielectric Slabs for Meteorology Radar"; found at https://arxiv.org/ftp/arxiv/papers/1703/1703.00964.pdf on Sep. 25, 2017.

(Continued)

*Primary Examiner* — Andrea Lindgren Baltzell
(74) *Attorney, Agent, or Firm* — Tarolli, Sundheim, Covell & Tummino LLP

(57) ABSTRACT

An antenna array that can include a plurality of antenna cells positioned in a global coordinate system of the antenna array. Each of the plurality of antenna cells has a respective local coordinate system and can include a radiating element having a predetermined angle of rotation defined in the global coordinate system and an antenna port coupled to the radiating element, the antenna port being positioned at a particular set of coordinates in the respective local coordinate system. The particular set of coordinates of the antenna port of each of the plurality of antenna cells can be the same.

20 Claims, 12 Drawing Sheets

(56) References Cited

U.S. PATENT DOCUMENTS

| | | | |
|---|---|---|---|
| 2005/0128028 A1* | 6/2005 | Sanchez | H01P 1/2005 |
| | | | 333/157 |
| 2015/0022421 A1 | 1/2015 | Vigano et al. | |
| 2016/0054439 A1 | 2/2016 | Brookner et al. | |
| 2016/0294065 A1* | 10/2016 | Lindmark | H01Q 13/10 |
| 2017/0077610 A1* | 3/2017 | Bongard | H01Q 21/0025 |

FOREIGN PATENT DOCUMENTS

| | | |
|---|---|---|
| EP | 3220481 A1 | 9/2017 |
| WO | 2003/007423 A1 | 1/2003 |
| WO | 2013/134585 A2 | 9/2013 |

OTHER PUBLICATIONS

Natera, et al: "New Antenna Array Architectures for Satellite Communications"; INTECH Open Access Publisher; 2011.

Wang, et al: "Wideband Circularly Polarized Square Slot Array Fed by Slotted Waveguide for Satellite Communication"; found on the Internet Aug. 30, 2018 at: http://www.jpier.org/PIERL/pierl61/17.16030603.pdf; Progress In Electromagnetics Research Letters, vol. 61, 111-118, 2016.

International Search Report for corresponding PCT/US2019/040175, dated Oct. 14, 2019.

\* cited by examiner

ANTENNA ARRAY WITH INDEPENDENTLY ROTATED RADIATING ELEMENTS

TECHNICAL FIELD

This relates generally to antennas and more particularly to an antenna array with rotated radiating elements.

BACKGROUND

An antenna array (or array antenna) is a set of multiple radiating elements that work together as a single antenna to transmit or receive radio waves. The individual radiating elements (often referred to simply as "elements") can be connected to a receiver and/or transmitter by circuitry that applies appropriate amplitude and/or phase adjustment of signals received and/or transmitted by the radiating elements. When used for transmitting, the radio waves radiated by each individual radiating element combine and superpose with each other, adding together (interfering constructively) to enhance the power radiated in desired directions, and cancelling (interfering destructively) to reduce the power radiated in other directions. Similarly, when used for receiving, the separate received signals from the individual radiating elements are combined with the appropriate amplitude and/or phase relationship to enhance signals received from the desired directions and cancel signals from undesired directions.

An antenna array can achieve an elevated gain (directivity) with a narrower beam of radio waves, than can be achieved by a single antenna. In general, the larger the number of individual antenna elements used, the higher the gain and the narrower the beam. Some antenna arrays (such as phased array radars) can be composed of thousands of individual antennas. Arrays can be used to achieve higher gain (which increases communication reliability), to cancel interference from specific directions, to steer the radio beam electronically to point in different directions and/or for radio direction finding.

SUMMARY

One example relates to an antenna array that can include a plurality of antenna cells positioned in a global coordinate system of the antenna array. Each of the plurality of antenna cells has a respective local coordinate system and can include a radiating element having a predetermined angle of rotation defined in the global coordinate system and an antenna port coupled to the radiating element, the antenna port being positioned at a particular set of coordinates in the respective local coordinate system. The particular set of coordinates of the antenna port of each of the plurality of antenna cells can be the same. Additionally, the predetermined angle of rotation of the radiating element of a first antenna cell of the plurality of antenna cells is a first rotation angle in the global coordinate system. The predetermined angle of rotation of the radiating element of a second antenna cell of the plurality of antenna cells can be a second rotation angle in the global coordinate system. The second rotation angle can be different than the first rotation angle.

Another example relates to a multi-layer printed circuit board (PCB) that can include a beam-forming layer having a plurality of traces that form a beam-forming network (BFN), wherein the beam-forming network is coupled to a plurality of antenna ports forming vias extending away from the beam-forming network (BFN). The BFN can include a plurality of combiners/dividers that convert between an input signal and a plurality of sub-signals. Each of the plurality of sub-signals can have an equal power and an array of phases. Each of the plurality of sub-signals can be communicated to an antenna port of the plurality of antenna ports. The multi-layer PCB can also include a plurality of antenna cells being positioned in a global coordinate system of the multi-layered PCB to form a regular tiling pattern. Each of the plurality of antenna cells can have a respective local coordinate system. Each antenna cell can include a radiating layer comprising a radiating element that has a predetermined angle of rotation in the global coordinate system. Each antenna cell can also include a feedline layer that can have a feedline that couples a corresponding antenna port of the plurality of antenna ports to the radiating element. Each antenna port can intersect with the feedline layer at a particular set of coordinates in the respective local coordinate system. The particular set of coordinates for each of the plurality of antenna cells can be the same. Additionally, the predetermined angle of rotation of the radiating element of a first antenna cell of the plurality of antenna cells can be a first rotation angle in the global coordinate system. The predetermined angle of rotation of the radiating element of a second antenna cell of the plurality of antenna cells can be a second rotation angle in the global coordinate system, the second rotation angle can be different than the first rotation angle.

DETAILED DESCRIPTION

This disclosure describes an antenna array with a plurality of antenna cells positioned in a global coordinate system, and each antenna cell has its own respective local coordinate system. Each antenna cell in the antenna array can have a radiating element (e.g., a slot-coupled patch antenna) with a predetermined angle of rotation in the global coordinate system. Moreover, each antenna cell can have an antenna port that can be coupled to the corresponding radiating element. The antenna port can be positioned at a particular set of coordinates in the respective local coordinate system. In some examples, this particular set of coordinates can be the same for each respective local coordinate system of the antenna cells. In other words, in some examples, the angle of rotation of each antenna cell in the plurality of antenna cells in the global coordinate system does not change the position of the antenna port in each respective local coordinate system.

The antenna port of each of the plurality of antenna cells can be coupled to a beam-forming network (BFN) through an integrated circuit (IC) chip, as explained herein. By positioning each antenna port in the same coordinates in each local coordinate system, the design of the BFN can be simplified. In particular, the positions of the antenna ports can be regular, such that the BFN can be designed systematically and independent of the angle of rotation of the radiating elements of the antenna cells. Additionally, rotation of the antenna elements can improve polarization purity. In other words, rotation of the antenna elements increases the ratio of a desired polarization component relative to an undesired component.

Figure 1:
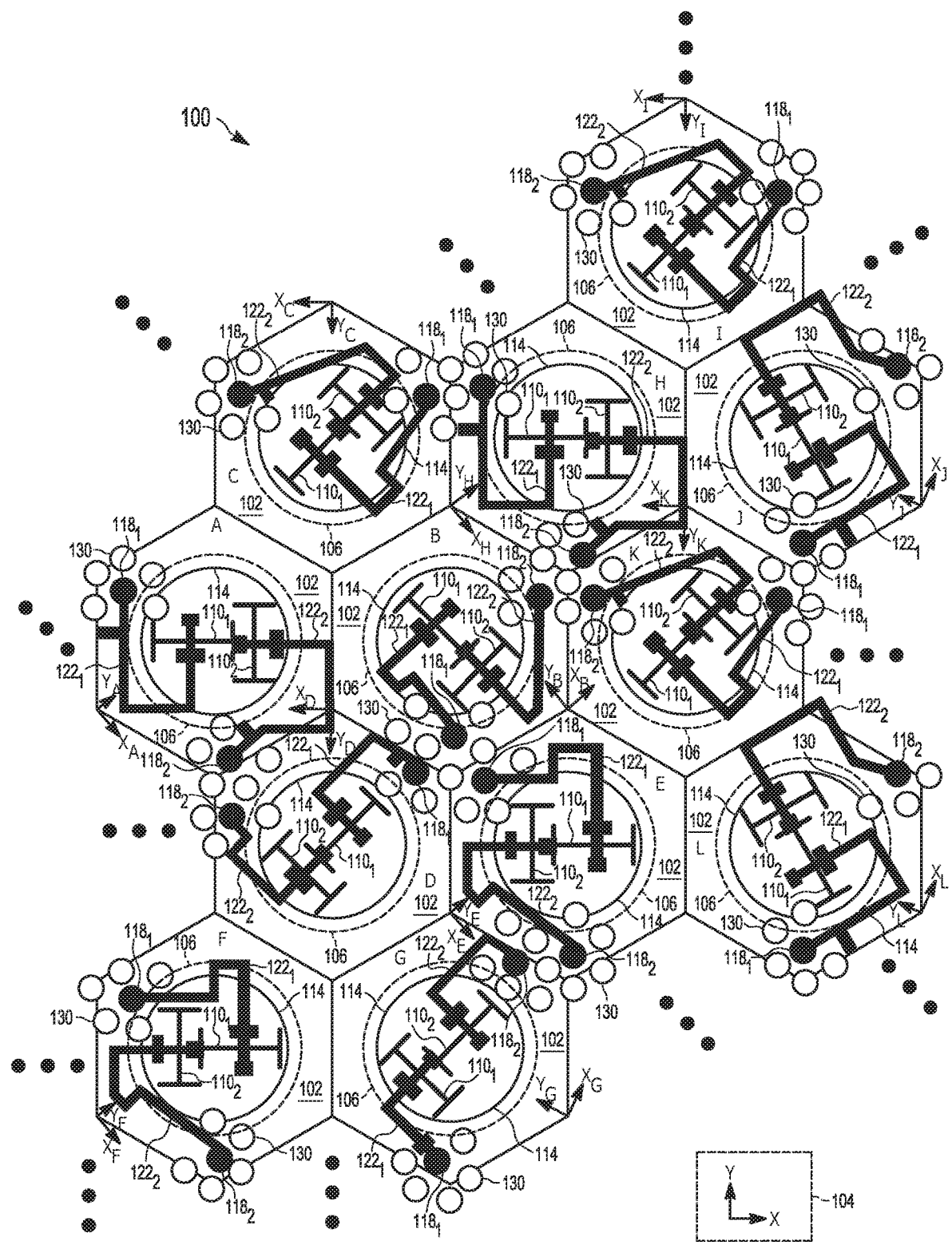
FIG. 1 illustrates a plan view of an antenna array with a plurality of antenna cells.

FIG. 1 illustrates a plan view of an example of an antenna array 100 with a plurality of antenna cells 102. The antenna array 100 can be implemented, for example, as a phased array antenna. The antenna cells 102 can be arranged in a regular tiling pattern. The antenna array 100 can be formed on a top layer and/or region of a multi-layer printed circuit board (PCB), which can alternatively be referred to as a multi-layer printed wire board (PWB). For purposes of simplification of explanation, some layers are omitted and/or or illustrated as being transparent. In the present example, there are twelve (12) antenna cells 102, but in other examples, there can be more or less antenna cells 102. In fact, in some examples, there can be one-hundred, one-thousand or more antenna cells 102. Each of the twelve (12) antenna cells are labeled A-L. Accordingly, a given antenna cell 102 can be identified and referenced specifically. For instance, a first antenna cell 102 can be referenced as "antenna cell A 102", and an eighth antenna cell can be referenced as "antenna cell H 102". The antenna cells B-L 102 can also be referenced in this manner.

In the example illustrated, each antenna cell 102 has a hexagonal shape. In other examples, other shapes can be employed to implement the plurality of antenna cells 102, including shapes such as squares, rectangles or rhombuses that provide regular tiling.

The antenna array 100 includes a global coordinate system 104 that defines a global position for the entire antenna array 100. More particularly, the global coordinate system 104 identifies a relative position of each of the plurality of antenna cells 102. Each of the antenna cells 102 can have a predetermined angle of rotation in the global coordinate system 104. Additionally, each of the antenna cells 102 can include a radiating element 106 with a predetermined angle of rotation in the global coordinate system 104 that may be different (or the same) as the angle of rotation of the antenna cell 102 in the global coordinate system 104. In other words, the angle of rotation in the global coordinate system 104 of the radiating element 106 in a given antenna cell 102 can be selected independently of the angle of rotation in the global coordinate system 104 of the antenna cell 102.

Each of the plurality of the antenna cell 102 can have a predetermined angle of rotation in the global coordinate system 104. Additionally, each antenna cell 102 can include a local coordinate system. In the example illustrated in FIG. 1, an origin of each local coordinate system is positioned at a given vertex of the corresponding antenna cell 102. As an example, the local coordinate system for antenna cell A 102 is labeled as $X_A$, $Y_A$ to denote respective X and Y axes for the local coordinate system of the antenna cell A 102. Antenna cells B-H are labeled in a similar manner.

As described herein, each radiating element 106 includes a plurality of constituent structural components. In particular in the antenna array 100, each radiating element 106 can include N number of slot elements 110, where N is an integer greater than or equal to one (1) and a metallic patch radiator 114. Each slot element 110 can have an 'H' or dumbbell shape. Moreover, although in the illustrated and described example the radiating element 106 includes the N number of slot elements 110 and the metallic patch radiator 114, other types of radiators for the radiating element 106 are possible. In the example illustrated, there are two (2) slot elements 110, which can be individually referenced with a subscript number. More particularly, in the illustrated example, each radiating element includes a first slot element $110_1$ and a second slot element $110_2$ that are orthogonally orientated with respect to each other. In other words, the first slot element $110_1$ can have a predetermined angle of rotation in the global coordinate system 104 and the second slot element $110_2$ can be rotated by 90 degrees relative to the first slot element $110_1$. Thus, collectively, the first slot element $110_1$ and the second slot antenna $110_2$ can have a predetermined angle of rotation in the global coordinate system 104 that can define the predetermined angle of rotation of the radiating element 106 for the antenna cell 102. Additionally, in some examples, there can be more or less slot elements 110 than the first slot element $110_1$ and the second slot element $110_2$. The angle of rotation in the global coordinate system 104 can be defined relative to a particular structural element or a set of elements of a given antenna cell 102, such as, but not limited to a port 118 (or multiple ports 118). Similarly, in such a situation, the same particular structural element or set of element in other antenna cells 102 can be employed to define the angle of rotation of the other antenna cells 102. In other words, the angle of rotation in the global coordinate system 102 is defined in the same manner across each of the A-L antenna cells 102.

In some examples, the angle of rotation in the global coordinate system 104 for each radiating element 106 can be, for example one of 0 degrees, +/−30 degrees, +/−90 degrees and +/−150 degrees. In other examples, other angles of rotation in the global coordinate system 104 may be used. Moreover, the pattern of the angle of rotation of the radiating elements 106 of antenna cells 102 can vary based on desired operational characteristics of the antenna array 100. For example, it can be desirable to select a pattern for the antenna elements 106 that provides a high degree of polarization purity in a main beam for scanning in multiple directions and maintaining side lobes of a radiation pattern below a certain level.

The first slot element $110_1$ and the second slot element $110_2$ can be designed to communicate signals without substantially affecting the relative phase difference between signals of the first slot element $110_1$ and the second slot element $110_2$. For example, each radiating element 106 of each respective antenna cell 102 can be designed to communicate circularly polarized signals. For example, the first slot element $110_1$ of the radiating element 106 can be designed to communicate signals with a first linear polarization and the second slot element $110_2$ of the radiating element 106 can be designed to communicate signals with a second polarization. As one example, the first polarization can be offset relative to the second polarization. Additionally, as noted, there are examples where there is only one slot element 110 for each radiating element 106 and/or other types of radiators are employed for the radiating element 106. In these situations, the radiating element 106 can also be designed to communicate signals circular polarization or with other polarizations, such as linear or elliptical polarization.

Moreover, as noted, the radiating element 106 of each antenna cell 102 can include a metallic patch radiator 114 that can overlay the first slot element $110_1$ and the second slot element $110_2$. The metallic patch radiator 114 can overlay a center of the antenna cells 102. In some examples, the metallic patch radiator 114 can be formed on an upper surface of the antenna array 100. In such a situation, the metallic patch radiator 114 can be formed by etching away a portion a (top) thin metal layer, with the un-etched portion forming the metallic patch radiator 114.

For purposes of simplification of explanation the terms "overlay", "overlaying", "underlay" and "underlaying" (and derivatives) are employed throughout this disclosure to denote a relative position of two adjacent surfaces in a selected orientation. Additionally, the terms "top" and "bottom" are employed throughout this disclosure to denote opposing surfaces in the selected orientation. Similarly, the terms "upper" and "lower" are employed to denote relative positions in the selected orientation. In fact, the examples used throughout this disclosure denote one selected orientation. However, in the described examples, the selected orientation is arbitrary, and other orientations are possible (e.g., upside down, rotated by 90 degrees, etc.) within the scope of the present disclosure.

Each antenna cell 102 can include N number of ports 118. Each port 118 can electrically couple a BFN to a corresponding slot element 110. Thus, in the illustrated example, each antenna cell 102 can include a first port $118_1$ and a second port $118_2$. Each antenna cell 102 can also include N number of feedlines 122 formed in a feedline layer (conductive traces) that intersects with a corresponding port 118 at a particular set of coordinates in the corresponding local coordinate system. Moreover, each feedline 122 can connect each slot element 110 with a corresponding port 118. More particularly, in the example illustrated in FIG. 1, a first feedline $122_1$ (a conductive trace) can connect a first port $118_1$ with a first slot element $110_1$. Similarly, a second feedline $122_2$ (a conductive trace) can connect a second port $118_2$ and a second slot element $110_2$. Each feedline 122 in a given antenna cell 102 can have the same length. Thus, the first feedline $122_1$ and the second feedline $122_2$ of the antenna cell A 102 can be the same length. In some examples, the feedlines 122 of each different antenna cells 102 can have the same lengths. To offset (counteract) the effects of rotation in each antenna cell 102, additional phase adjustment (e.g., through subsequent or prior signal conditioning, as described herein) can be applied to signals communicated by particular antenna cells 102. As an example, antenna cell A 102 and antenna cell D 102 can have feedlines 122 that are the same length, but signals communicated with antenna cell A 102 and antenna cell D 102 have different phases. The phase adjustment can be employed to offset for these different phases.

In some examples, each port 118 can be positioned near a perimeter (e.g., near a vertex) of the corresponding antenna cell 102. Accordingly, in the plan view illustrated by FIG. 1, each port 118 is located between the corresponding radiating element 106 and the perimeter of the corresponding antenna cell 102. In the example illustrated by the antenna array 100 of FIG. 1, the first port $118_1$ and the second port $118_2$ are positioned near vertices of the antenna cell 102. Additionally, the first port $118_1$ and the second port $118_2$ are separated by the given (single) vertex that includes the origin of the local coordinate system. Accordingly, in some examples, each set of ports 118 for a given antenna cell 102 can be positioned at a same set of local coordinates. In other words, the first port $118_1$ for each antenna cell 102 can be positioned at the same set of local coordinates in each of the antenna cells A-H 102. Similarly, the second port $118_2$ for each antenna cell 102 can be positioned at the same set of local coordinates of each of the antenna cells A-L. Alternatively, in other examples, the position of each of the N number of ports can vary in the local coordinates of each antenna cell 102.

Each of the N number of ports 118 in each antenna cell 102 can be formed as a via (also referred to as a plated through hole) that extends through one or more layers to IC chips and/or the BFN, depending on the design of the BFN. In this manner, each of the illustrated ports 118 (including the first port $118_1$ and the second port $118_2$) of each antenna cell 102 can represent a terminal of the via. In some examples, each port 118 can be considered as a long transition through the whole multi-layer PCB, on which the antenna array 100 can be formed. Additionally or alternatively, the N number of ports 118 can be other types of interfaces for communicating signals between the BFN and each antenna cell 102. Positioning each port 118 near a perimeter of the antenna cell 102 and away from the radiating element 106 of the antenna cell 102 (positioned near a center) can reduce electromagnetic coupling. In some examples, each port 118 (or some subset thereof) can be environed by a plurality of isolation vias 130 positioned equidistant to a corresponding port 118, which can alternatively be referred to as shielding vias. In other examples, the plurality of isolation vias 130 can be positioned at differing distances to a corresponding port 118. The isolation vias 130 can mimic co-axial shielding for the port 118. For purposes of simplification of illustration, only some of the isolation vias 130 are labeled. The isolation vias 130 can extend fully or partially between the plurality of antenna cells 102 of the antenna array 100 and the BFN. The antenna array 100 can be designed such that each port 118 is in close proximity to five (5) isolation vias 130.

As illustrated, each port 118 of a given antenna cell 102 can be positioned near two other ports 118 on two other antenna cells 102. Additionally, each of the isolation vias 130 can be located near a vertex and/or on a perimeter of an antenna cell 102. In this manner, the same isolation via 130 can provide shielding for multiple ports 118. For example, an isolation via 130 located at a vertex common to antenna cells B, D and E 102 can concurrently provide shielding for the first port $118_1$ of antenna cells B, D and E 102. Accordingly, by rotating each antenna cell 102 in the global coordinate system 104 in the manner illustrated, the total number of isolation vias 130 needed to provide shielding on five (5) sides of each port 118 can be reduced.

As noted, each antenna cell 102 can have an angle of rotation in the global coordinate system 104. In some examples, a given antenna cell 102 can be rotated relative to another antenna cell 102. For instance, antenna cell B 102 can be rotated in the global coordinate system 104 relative to antenna cell A 102 by 120 degrees.

Additionally, although the radiating elements 106 of each antenna cell 102 have an angle of rotation defined in the global coordinate system 104, each radiating element 106 can also have a local angle of rotation defined in the corresponding local coordinate system. In such a situation, the local angle of rotation for a radiating element 106 of a given antenna cell 102 can be offset from the local angle of rotation for a radiating element 106 of another antenna cell 102. For example, the local angle of rotation of the radiating element 106 in the local coordinate system of the antenna cell B 102 can be offset from the local angle of rotation of the radiating element 106 in the local coordinate system of the antenna cell A 102 by 120 degrees.

Further still, in a given example, a given antenna cell 102 can have an angle of rotation in the global coordinate system 104 that is different than the angle of rotation in the global coordinate system 104 for another antenna cell 102. Additionally, in the given example, the radiating elements 106 of the given and the other antenna cells 102 can have the same angle of rotation in the global coordinate system 104. For example, antenna cell D 102 and antenna cell G 102 can have different angles of rotation in the global coordinate system 104. However, the radiating element 106 of the antenna cells D and G 102 can have the same angle of rotation in the global coordinate system 104 since the radiating element 106 of antenna cells D and G 102 can have different angles of rotation in the respective local coordinate systems. As discussed herein, to account for the different angles of rotation of the antenna cells 102 in the global coordinate system 104, phases of signals communicated by the radiating elements 106 of the antenna cells can be adjusted.

In some examples, each antenna cell 102 can be a member of a group of antenna cells 102. In some examples, a given group of antenna cells 102 can share an intersecting point (e.g., such as a common vertex in examples where the antenna cells 102 are polygons). Accordingly, in the example illustrated in FIG. 1, a first group of antenna cells could be formed with antenna cells A, B and C 102. Additionally, a second group of antenna cells 102 can be formed with antenna cells D, F and G 102. The antenna array 100 can be designed such that the rotation angle of each radiating element 106 in a given group of antenna cells 102 defines a group rotation pattern. As used herein, the term "group rotation pattern" denotes a specific set of rotations of the radiating element 106 for each member of the group. As one example, if the radiating element 106 of the antenna cell A 102 has a rotation angle of 0 degrees, the antenna cell B 102 has a rotation angle of 30 degrees and the antenna cell C 102 has an angle of rotation of −30 degrees, the combined set of 0 degrees, 30 degrees and −30 degrees in the relative locations of cells A, B and C 102 defines the group rotation pattern. In some examples, the antenna array 100 can be designed such that adjacent groups of antenna cells have different group rotation patterns. Additionally, in some examples, it can be desirable to avoid repeating the same angle of rotation of the radiating element 106 for a group of antenna cells 102 throughout the antenna array 100 to avoid elevated side lobes for the overall radiation pattern of the antenna array 100.

In operation, the antenna array 100 can communicate signals between free space and the BFN. In particular, in a receiving mode, an electromagnetic (EM) signal transmitted in free space can be provided to the N number of slot elements 110 by the corresponding metallic patch radiator 114. The N number of slot elements 110 on the corresponding antenna cell 102 can convert a radiated EM signal into a guided EM signal. Each of the N number of feedlines 122 can provide the electrical signals to the corresponding port 118. Each port 118 can provide the electrical signal to an IC chip coupled to the BFN. In some examples, the IC chip can be an integrated component of the BFN. In other examples, the IC chip and the BFN can be separate, but coupled components. The IC chip can adjust (e.g., combine, amplify and/or phase adjust) the electrical signal and provide an adjusted electrical signal to the BFN. The BFN can combine the adjusted electrical signal to form a received beam signal and provide the received beam signal to an external system for further processing and/or decoding.

In a transmitting mode, an electrical signal can be provided from the BFN to the IC chips. The IC chips can adjust the signals and provide the adjusted signals to the N number of ports 118 at each of the antenna cells 102. The electrical signals can be provided to the corresponding slot elements 110 of the antenna cells 102. The slot elements 110 can convert a guided EM signal into a radiated EM signal that is transmitted to the corresponding metallic patch radiator 114 of each antenna cell 102. The patch antennas 114 can transmit the EM signal into free space.

In some examples, the antenna array 100 can be designed to operate exclusively in either the receiving mode or the transmitting mode. In other examples, the antenna array 100 can operate in a half-duplexing mode, such that the antenna array 100 can operate in the receiving mode and the transmitting mode periodically and/or asynchronously. In still other examples, the antenna array 100 can operate in a full-duplexing mode, such that the antenna array 100 can operate in the receiving mode and the transmitting mode concurrently.

By implementing the antenna array 100, the radiating elements 106 of each antenna cell 102 can be selected to have an angle of rotation in the global coordinate system 104 that is independent on the location of the N number of ports 118 at each antenna cell 102. Stated differently, the N number of slot elements 110 for each antenna cell 102 (namely, the first slot element $110_1$ and the second slot element $110_2$) can be rotated in the global coordinate system 104 without necessitating a change in the location of the corresponding N number of ports 118, namely the first port $118_1$ and the second port $118_2$. Rather, each antenna cell 102 can be designed such that the location of the ports 118 varies based on the angle of rotation of the entire individual antenna cell 102, and that the angle of rotation of the slot elements 110 can vary independently of the angle of rotation of the antenna cell 102. Accordingly, the antenna array 100 can be designed such that the location of the ports 118 occurs at regular, predetermined positions in the global coordinate system 104. In this manner, as described herein, the BFN underlying the antenna array 100 can be designed independently from the antenna array 100. In fact, as explained in detail, the BFN underlying the antenna array 100 can have a systematic design.

Figure 2:
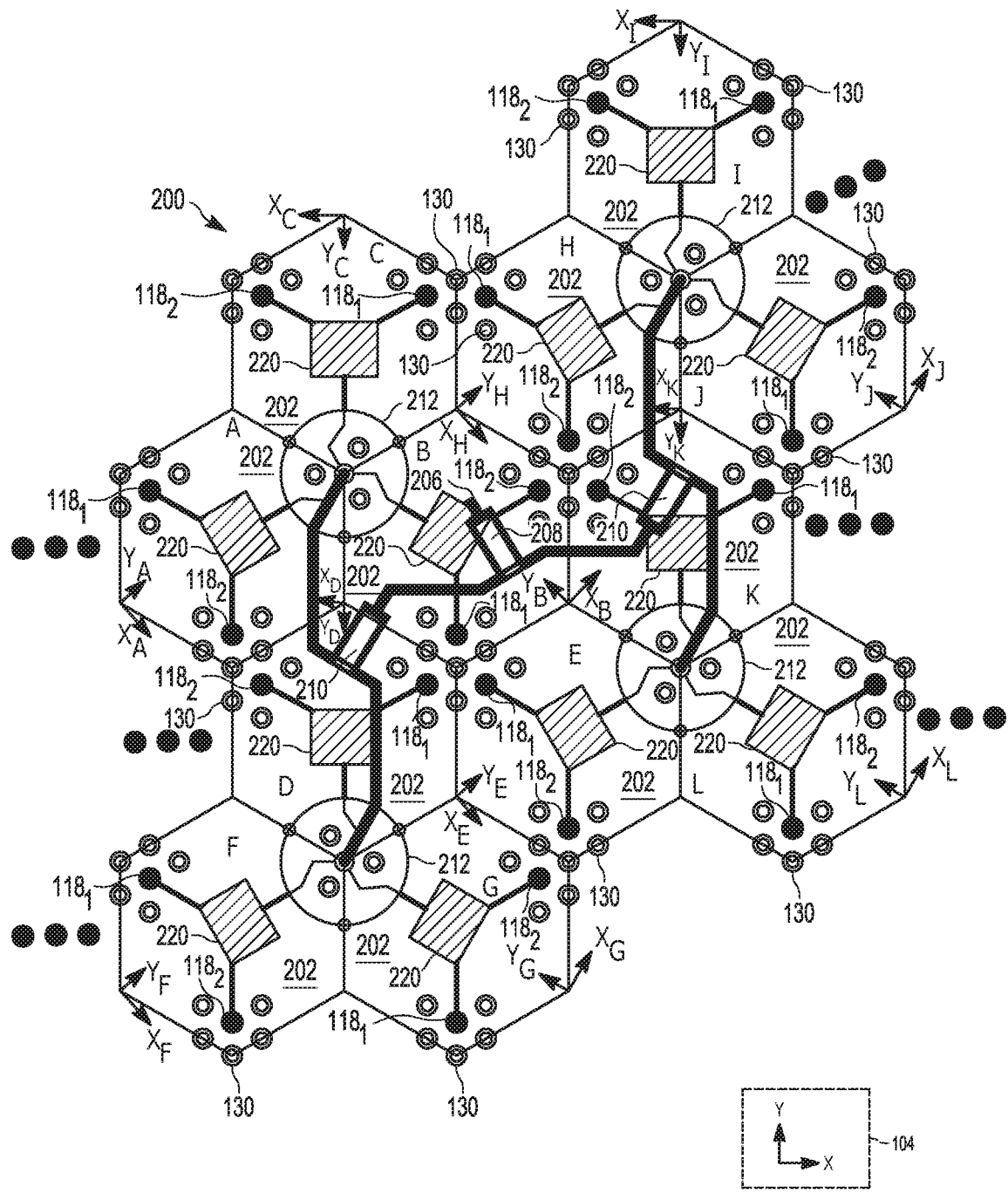
FIG. 2 illustrates a plan view of a beam-forming network (BFN) in communication with the antenna array of FIG. 1.

FIG. 2 illustrates a plan view of an example of a BFN 200 that can be employed to adjust signals communicated with the antenna array 100 of FIG. 1. The BFN 200 can be formed on an interior layer (e.g., a BFN layer) of the multi-layer PCB employed for the antenna array 100. The BFN layer can include a plurality of traces (conductive traces). For purposes of simplification of explanation, the same reference numbers are employed in FIGS. 1 and 2 to denote the same structure. The BFN 200 can be partitioned into a plurality of BFN cells 202 that are each rotated in the global coordinate system 104. As noted, the BFN 200 can underlay the antenna array 100 of FIG. 1. Moreover, each BFN cell 202 can have the same size and shape (e.g., a hexagon) as an overlaying antenna cell 102. Accordingly, the BFN cells 202 are labeled A-L to correspond to the overlaying antenna cells 202. Thus, BFN cell A 202 can underlay antenna cell A 202. Each BFN cell 202 can have the same local coordinate system as the corresponding antenna cell 102. Accordingly, BFN cell A 202 can have the same local coordinate system as the antenna cell A 202.

Each BFN cell 202 can include N number of ports 118. In the example illustrated by the BFN 200, each BFN cell 202 includes a first port $118_1$ and a second port $118_2$. Each port 118 can be representative of a terminal of a via to a port illustrated in the antenna array 100. For example, the first port $118_1$ of BFN cell A 202 can represent a terminal end of the via corresponding to the first port $118_1$ of the antenna cell A 102. Each of the N number of ports 118 can be at a same set of coordinates in each respective local coordinate system. Each of the N number of ports 118 can extend away from the BFN 200 and toward the antenna array 100. As explained with respect to the antenna array 100, each of the N number of ports 118 can be at a same set of coordinates in each local coordinate system.

Each of the N number of ports 118 can be environed by a plurality of isolation vias 130, only some of which are labeled. The isolation vias 130 can correspond to the isolation vias 130 of FIG. 1. In the example illustrated, there are five (5) isolation vias in close proximity to each port 118. However, in other examples, there can be more or less isolation vias 130. Moreover, the isolation vias 130 can be shared between ports 118 on different BFN cells 202, thereby reducing the overall number of isolation vias 130 needed to provide sufficient shielding for the ports 118. Additionally, in some examples, some of the isolation vias 130 can extend only partially between the BFN 200 and the antenna array 100 of FIG. 1.

The BFN 200 can include an input/output (I/O) port 206 that can be coupled to an external system or to another BFN of additional antenna cells in a manner described herein. The I/O port 206 can be coupled to a first stage combiner/divider 208, which can be coupled to two (2) second stage combiners/dividers 210. In this manner, the first stage combiner/divider 208 and the second stage combiners/dividers 210 have a cascade (hierarchical) relationship. In other words, the first stage combiners/dividers 208 can operate as a first stage of the BFN 200, and the second beam forming stage combiners/dividers 210 can operate as second beam forming stage of the BFN 200. Each of the second stage combiners/dividers 210 can be coupled to two (2) 1-to-3 combiners/dividers 212, which can operate as a third beam forming stage of the BFN 200. Each 1-to-3 combiner/divider 212 can be positioned at an intersection of three (3) BFN cells 202.

Figure 3:
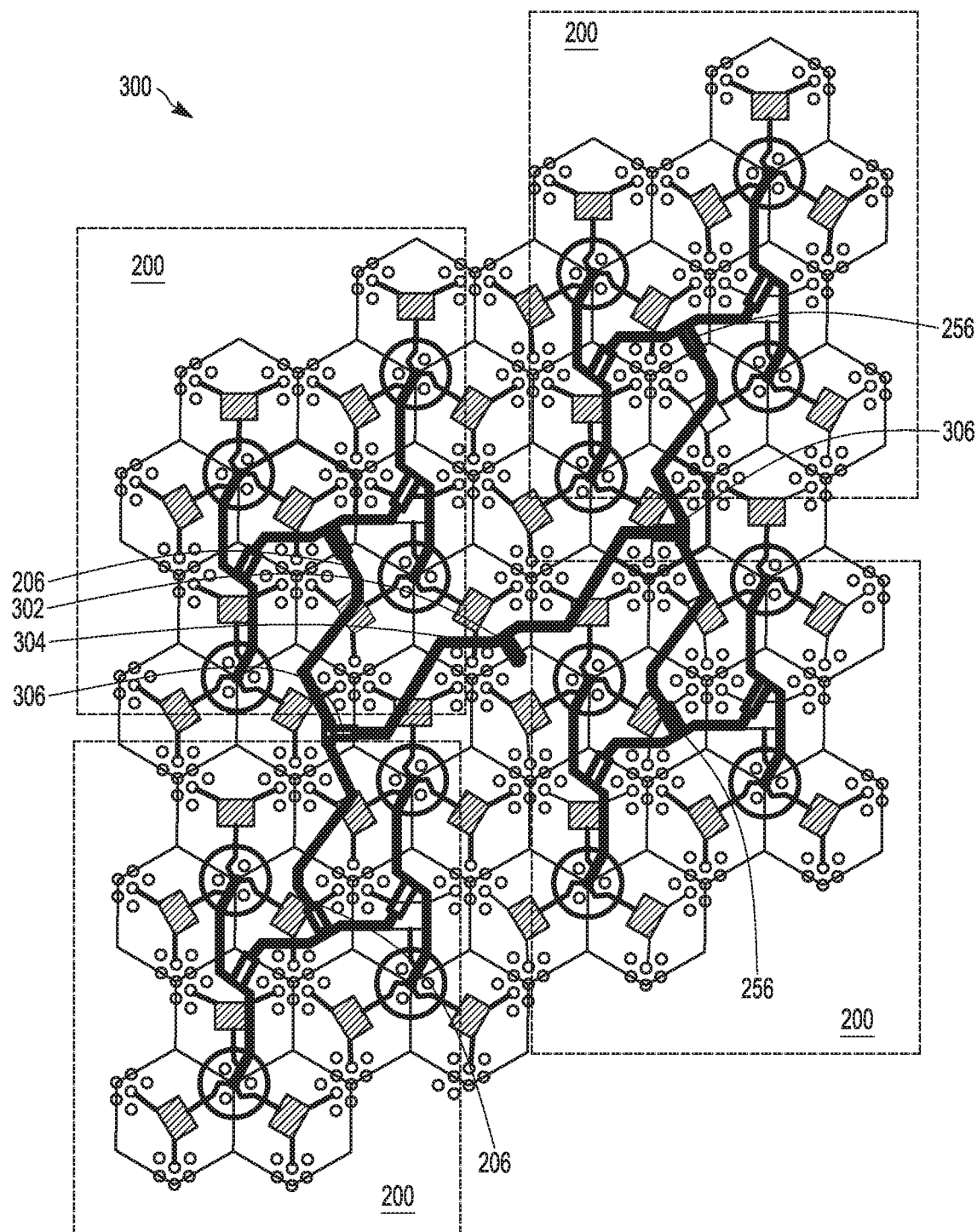
FIG. 3 illustrates an extended plan view of a BFN.

The second stage combiners/dividers 210 can be symmetrically arranged relative to the first stage combiners/dividers 208. The second stage combiners/dividers 210 can be fabricated on different layers of the BFN 200 than the BFN cells 202. For purposes of simplification of illustration, different line weights and/or patterns are employed to denote different layers of the BFN. A set of BFN cells 202, 1-to-3 combiner/divider 212 and a second stage divider 210 can define a beam forming stage that has a local coordinate system. In this manner, each beam forming stage (a combination of BFN cells 202, 1-to-3 combiner/divider 212 and a second stage divider 210) can have the same geometric shape in the local coordinate system. Moreover, the beam forming stages can be rotated in the global coordinate system 104 to facilitate the systematic design of the BFN 200. Furthermore, the systematic nature of the beam forming stages of the BFN 200 having the same geometric shape can also be present at additional stages across a sub-array, such as shown in FIG. 3. In other words, in FIG. 3, the geometric shape of the first three beam forming stages have the same geometric shape as other instances of the first three beam forming stages in an array. Thus, taken one step further in some examples, the geometric shape of a first four stages can have the same geometric shape as other first four stages in the array. Accordingly, each instance of the beam forming stage has the same geometric shape as another instance of the beam forming stage of the same stage. In other words, a given beam forming stage of the BFN 200 has the same geometric shape as another beam forming stage of the BFN 200 if the given and the other beam forming stages are the same stage (e.g., both the given and the other stages are first stages, second stages, etc.).

As used herein, the concept of each beam forming stage having the same geometric shape indices that the beam forming stage has the same shape with mirroring and/or rotation in the global coordinate system, such as illustrated in FIG. 3. Moreover, two beam forming stages can also be considered to have the same geometric shape if the two beam forming stages are symmetric about one or more lines of symmetry. Still further, two beam forming stages are considered to have the same geometric shape if the two beam forming stages are substantially identical without mirroring and/or rotation.

Each BFN cell 202 can be coupled to an integrated circuit (IC) chip 220 (or multiple IC chips) and/or other circuits that can adjust signals. The IC chip 220 can be mounted on a bottom of the multi-layer PCB that implements the BFN. Thus, each IC chip 220 can underlay the BFN 200. Each IC chip 220 can be coupled to a 1-to-3 combiner/divider 212 and to the N number of ports 118 of the BFN cell 202. As an example, the first port $118_1$ and the second port $118_2$ of the BFN cell A 102 can be coupled to the IC chip 220 of the BFN cell A 202, which is coupled to the 1-to-3 combiner/divider 212 positioned between BFN cell A 202, BFN cell B 202 and BFN cell C 202. Each IC chip 220 can adjust electrical signals. Such adjustment can include amplifying, phase adjusting, combining and/or dividing signals. In some examples, the IC chip 220 of three different BFN cells 202, such as BFN cells A, B and C 202 can adjust signal communicated with the corresponding 1-to-3 combiner 212 by an amount to compensate for rotation of radiating elements, such as the radiating elements 106 of FIG. 1.

The combiners/dividers described herein can execute one or both a dividing operation and a combining operation that convert between an input/output signal and a plurality of sub-signals. In the examples described herein, each dividing operation executed can divide an input signal into a plurality of sub-signals that have equal power and an array of phases. Conversely, in the examples described herein, in a combining operation, multiple sub-signals with an array of phases can be combined into a single combined signal.

In the transmitting mode, the first stage combiners/divider 208 can be designed to divide (e.g., equally or unequally, in-phase or out-of-phase) a signal input to the I/O port 206 into sub-signals that are provided to the second stage combiners/dividers 210. Similarly, in the transmit mode, each second stage combiner/divider 210 can divide (e.g., equally or unequally, in-phase or out-of-phase) a signal received from the first stage combiner/divider 208 into two (2) sub-signals that are coupled to 1-to-3 combiners/dividers 212. Each 1-to-3 combiner/divider can divide (e.g., equally or unequally, in-phase or out-of-phase) the signal to three (3) sub-signals that are each provided to an IC chip 220 corresponding to three (3) different BFN cells 202. For example, the 1-to-3 combiner/divider 212 positioned at the intersection of BFN cells A, B and C 202 can provide a signal to the IC chip 220 of BFN cells A, B and C 202.

Continuing in the transmitting mode, the IC chip 220 of each BFN cell 202 can be designed/programmed to adjust (amplify, phase adjust and/or divide) the signal into N number of signals that are provided to the N number of ports 118. For example, the IC chip 220 of the BFN cell 202 can be designed to amplify and divide the signal from the 1-to-3 combiner/divider 212 into two (2) sub-signals that are provided to the first port $118_1$ and the second port $118_2$ of the BFN cell A 202. The signals can then be transmitted in the manner described with respect to FIG. 1.

In the receiving mode, signals received at each of the N number of ports 118 in each of the BFN cells 202 can be combined and adjusted (amplified and/or phase adjusted) by the corresponding IC chip 220 and provided to a corresponding 1-to-3 combiner/divider 212. As an example, the IC chip 220 corresponding to BFN cells A, B and C 202 can each provide an adjusted signal to the 1-to-3 combiner/divider 212 at the intersection of the BFN cells A, B, and C 202.

Continuing in the receiving mode, each of the 1-to-3 combiners/dividers 212 can combine adjusted sub-signals and provide a combined signal to a corresponding second stage combiner/divider 210. In turn, the second stage combiners/dividers 212 can again combine the sub-signals and provide the combined signal to the first stage combiner/divider 208. The first stage combiner/divider 208 can combine the sub-signals, and output the combined signal at the I/O port 206.

Similar to the antenna array 100 of FIG. 1, the BFN 200 can be designed to operate exclusively in the transmitting mode or the receiving mode. Additionally, the BFN 200 can be designed to switch periodically and/or asynchronously between the transmitting mode and the receiving mode. Still further, in some examples, the BFN 200 can operate in the transmitting mode and the receiving mode concurrently.

As illustrated with the antenna array 100 of FIG. 1 and the BFN 200 of FIG. 2, the antenna cells 102 and the BFN cells 202 can communicate through the N number of ports 118. Moreover, the antenna array 100 can be designed such that the radiating elements 106 can be rotated independently from the location of the ports 118. Accordingly, the angle of rotation of the radiating elements 106 does not necessarily impact the physical layout of the BFN 200. Therefore, the BFN 200 and the antenna array 100 can be designed independently based on predetermined positions of each of the N number of ports 118 for each BFN cell 202 and each antenna cell 102. Thus, the overall design of the BFN 200 and the antenna array 100 can be simplified. In fact, the systematic design of the BFN 200 further demonstrates possibilities of a BFN when the BFN 200 is matched with the antenna array 100 of FIG. 1 (or a variant thereof). In particular, a designer of the BFN can be unburdened with concern for the individual placement of the ports 118. Instead, the ports 118 appear in regular, predictable positions that are readily accommodated by the various types of the antenna cells 102 of the antenna array 100.

In some examples, the BFN 200 can be designed with systematically symmetric modules that are scalable to accommodate nearly any number of levels of hierarchy. In particular, although the BFN 200 is described with two (2) stages of combiners/dividers, namely the first stage combiner/divider 208 and the second stage combiners/dividers 208, the BFN 200 illustrated can be employed as module or circuit to implement a larger scale BFN, including the BFN 300 illustrated in FIG. 3.

Figure 4:
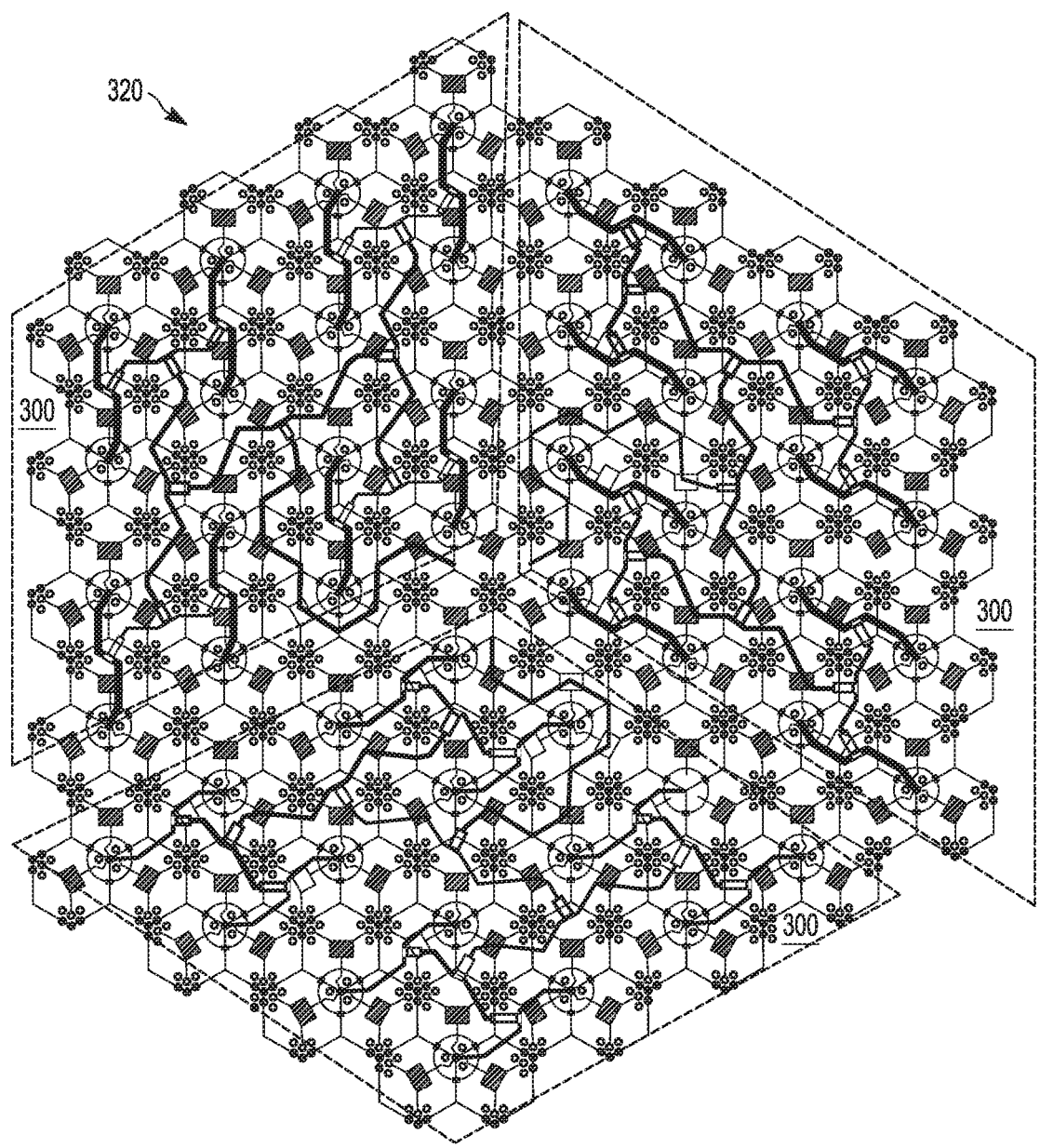
FIG. 4 illustrates an example of a BFN array.

In the BFN 300, four (4) instances of the BFN 200 of FIG. 2 are connected in a cascade (hierarchical) arrangement. In particular, an I/O port 302 is coupled to a first stage combiner/divider 304, which is coupled to two (2) second stage combiners/dividers 306. Each second stage combiner/divider 306 can be coupled to a port 206 of an instance of the BFN 200 (a module of the BFN 300). In this manner, the four (4) instances of the BFN 200 are connected together in a cascade arrangement. Further, in other examples, multiple instances of the BFN 300 can be coupled in another cascade arrangement, thus providing a systematic design for the BFN 300. Further, in some examples, multiple BFNs 300 can be included in a BFN array, such as the BFN array 320 illustrated in FIG. 4

In the BFN array 320, three (3) instances of the BFN 300 of FIG. 3 are arranged in an array. Moreover, although the instances of the BFN 300 are not coupled in FIG. 4, in other examples of the BFN array 320, each instance of the BFN 300 or some subset thereof can be coupled to provide another cascade (hierarchical) arrangement.

Figure 5:
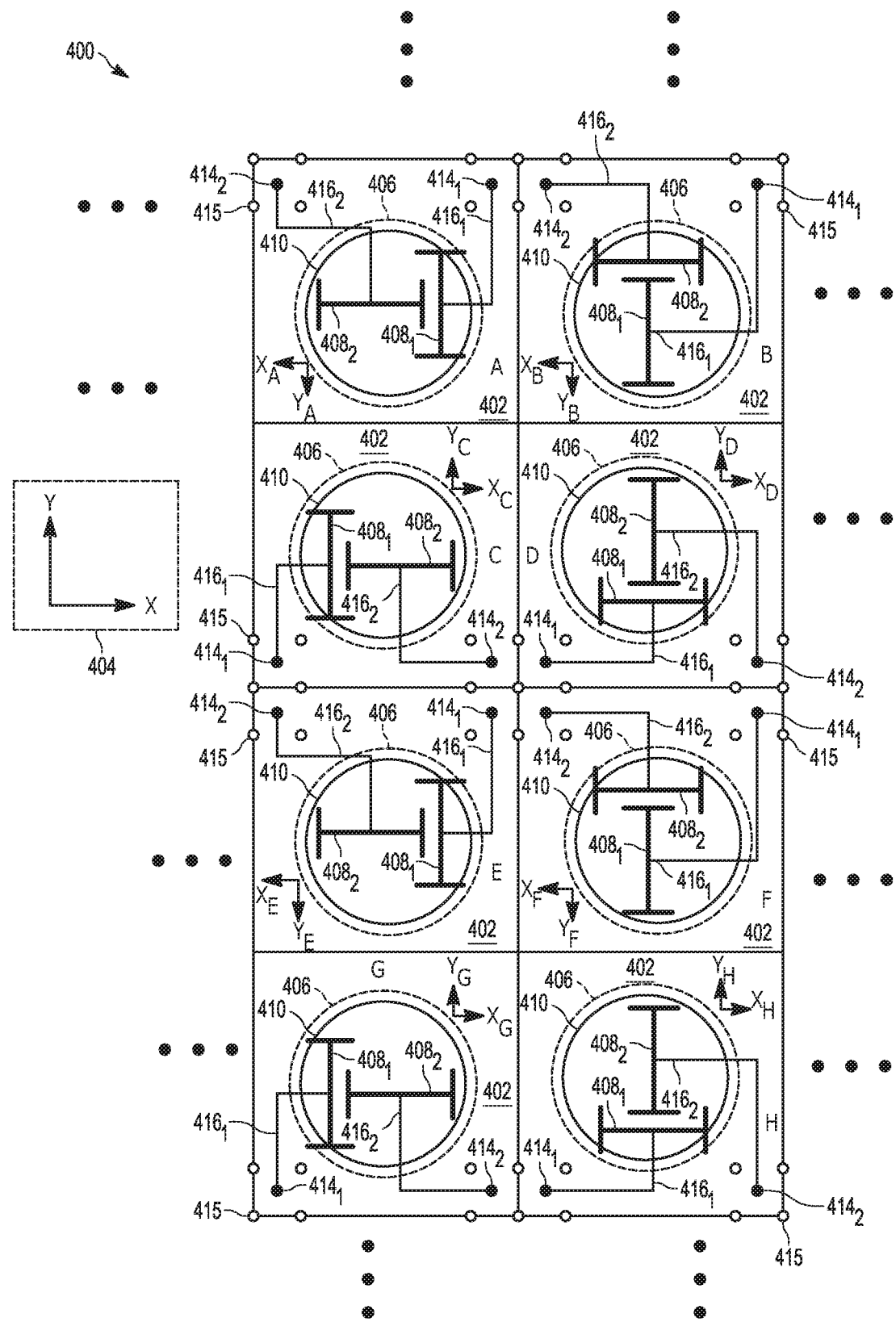
FIG. 5 illustrates plan view of another antenna array with a plurality of antenna cells.

FIG. 5 illustrates another plan view of an example of an antenna array 400. The antenna array 400 can be formed on a top layer and/or region of a multi-layer PCB. The antenna array 400 can include a plurality of antenna cells 402 arranged in a tile pattern. Each antenna cell 402 can have a square shape. The example illustrated by the antenna array 400 includes eight (8) antenna cells 402, labeled as antenna cells A-H. Each of the plurality of antenna cells 402 can be arranged in a global coordinate system 404. Moreover, each antenna cell 402 can include an instance of a radiant element 406. Each radiating element 406 can include N number of slot elements 408. In the example illustrated, each antenna cell 402 includes two orthogonally positioned slot elements 408, namely a first slot element 4081 and a second slot element 4082. Each radiating element 406 can also include a metallic patch radiator 410.

Each of the N number of slot elements 408 can be rotated in the global coordinate system 404. Additionally, each antenna cell 402 can include a local coordinate system labeled with an origin axis positioned near a corner of each antenna cell 402. Each antenna cell 402 can include N number of ports 414 that couple each respective antenna cell 402 to a BFN that underlays the antenna array 400. Each port 414 can include a via to couple each respective antenna cell 402 to the BFN. Moreover, each port 414 in FIG. 5 can be representative of a terminal of the via. In the illustrated example, each antenna cell includes two (2) ports 414, namely a first port $414_1$ and a second port $414_2$. Additionally, in the example illustrated, each of the first port $414_1$ and the second port $414_2$ can be positioned at adjacent corners of the antenna cells 402. As used herein, "adjacent corners" are defined as two corners that share a side of a polygon. Each antenna cell 402 can include N number of feedlines 416 that are formed on a feedline layer of the antenna array 400. In the example illustrated, there are two (2) feedlines, namely a first feedline 4161 and a second feedline 4162. Each feedline 416 can couple a port 414 with a corresponding slot element 408. Each of the N number of feedlines 416 of the antenna array 400 have the same length. Signals communicated with the radiating elements 406 can be phase adjusted to compensate (counteract) the rotation of the radiating elements 406.

Each of the ports 414 can be environed by a plurality of isolation vias 415 positioned equidistant to a corresponding port 414. In the example illustrated, there are four (4) isolation vias 415 in close proximity to each port 414. However, in other examples, there can be more or less isolation vias 415. Moreover, the isolation vias 415 can be shared between ports 414 on different antenna cells 402, thereby reducing the overall number of isolation vias 415 needed to provide sufficient shielding for the ports 414. Additionally, in some examples, some of the isolation vias 415 can extend only partially between the BFN and the antenna array 400.

Each of the N number of ports 414 in each antenna cell 402 can be positioned at a set of coordinates in a corresponding local coordinate system, which can be the same set of coordinates in each local coordinate system. In such examples, the ports 414 can intersect the feedline layer that contains the feedlines 416 at the set of coordinates in the local coordinate system of each antenna cell 402. In other words, the first port 414$_1$ of the antenna cell A 402 can have the same set of coordinates in the corresponding local coordinate system as the first port 414$_1$ of the antenna cell B 402. In this manner, the ports 414 can be located at regular, predetermined positions throughout the antenna array 400.

In some examples, the angle of rotation of each radiating element 406 in the global coordinate system 404 can be 0 degrees, +/−90 degrees, +/−180 degrees and +/−270 degrees. In other examples, other angles of rotation in the global coordinate system 104 are possible. Additionally, the antenna array 400 can operate in the same (or similar manner) as the antenna array 100 of FIG. 1. Accordingly, each antenna cell 402 of the antenna array 400 can be designed to communicate RF signals with free space. In other words, the antenna array 400 can be designed to at least one of transmit RF signals into free space and receive RF signals from free space. Such communicated signals can be adjusted by a BFN and (in some examples), IC chips, as explained herein.

Figure 6:
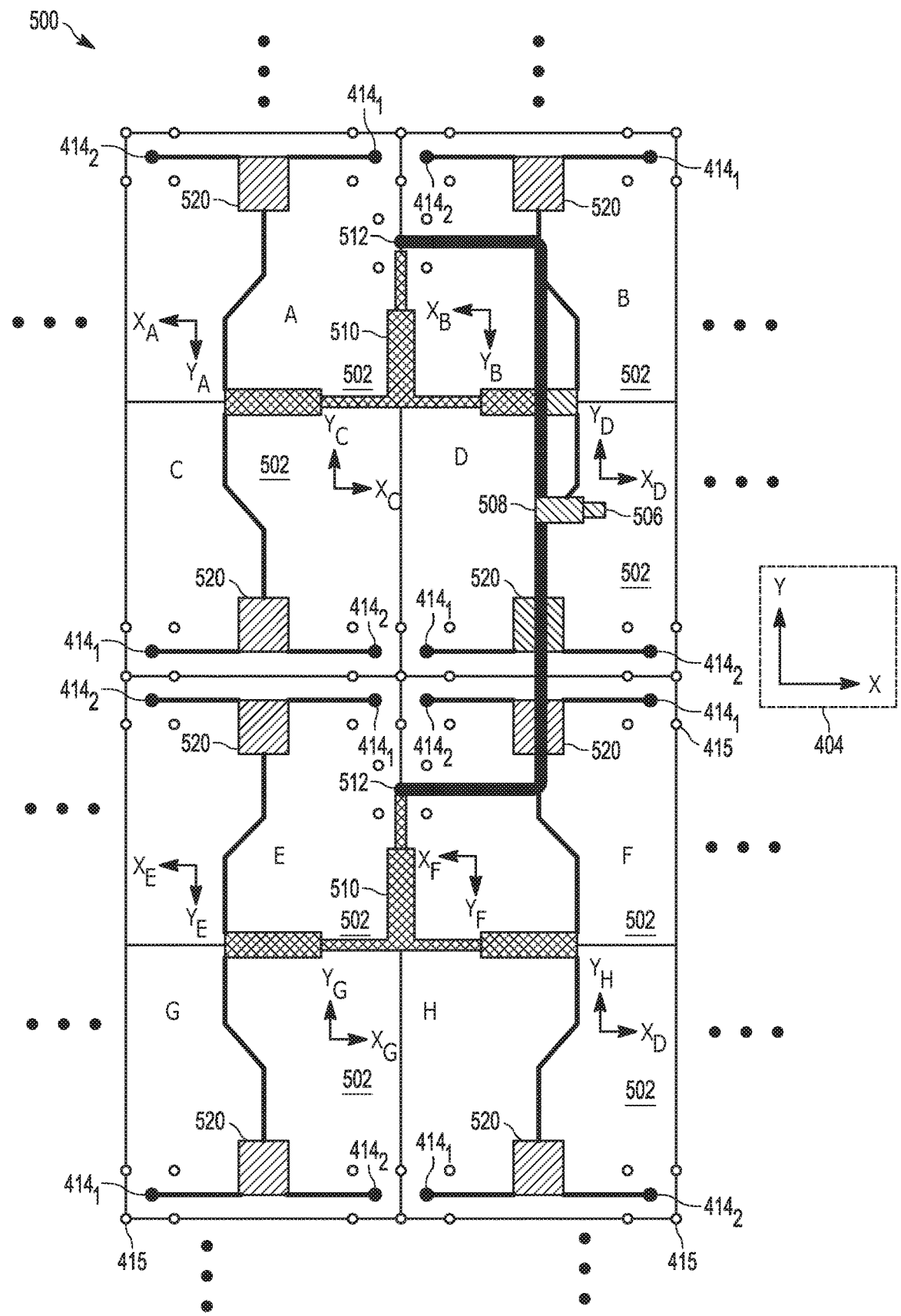
FIG. 6 illustrates a plan view of another BFN in communication with the antenna array of FIG. 5.

FIG. 6 illustrates a plan view of an example of a BFN 500 that can be employed to communicate with the antenna array 400 of FIG. 5. Some elements of the BFN 500 can be formed on an interior layer of the multi-layer PCB employed for the antenna array 400, and other elements can be formed on an exterior layer of the BFN 500, such as a bottom layer of the BFN 500. For purposes of simplification of explanation, the same reference numbers are employed in FIGS. 5 and 6 to denote the same structure. The BFN 500 can be partitioned into a plurality of BFN cells 502 that are each rotated in the global coordinate system 404. As noted, the BFN 500 can underlay the antenna array 400 of FIG. 5. Moreover, each BFN cell 502 can have the same size and shape (e.g., a square) as an overlaying antenna cell 402. Accordingly, the BFN cells 502 are labeled A-H to correspond to the overlaying antenna cell 402 with the same label A-H. Thus, BFN cell A 502 underlies antenna cell A 402. Each BFN cell 502 can have the same local coordinate system as the corresponding antenna cell 402.

Each BFN cell 502 can include N number of ports 414. In the example illustrated by the BFN 500, each BFN cell 502 includes a first port 414$_1$ and a second port 414$_2$. Each port 414 can be representative of a terminal of a via to a port 414 illustrated in the antenna array 400. As explained with respect to the antenna array 400, each of the N number of ports 414 can be at a same set of coordinates in each respective local coordinate system.

Each of the N number of ports 414 can be environed by a plurality of isolation vias 415, only some of which are labeled. The isolation vias 415 can correspond to the isolation vias 415 of FIG. 5. In some examples, some of the isolation vias 415 can extend only partially between the BFN 500 and the antenna array 400 of FIG. 5.

The BFN 500 can include an I/O port 506 that can be coupled to an external system. The I/O port 506 can be coupled to a first stage combiner/divider 508, which can be coupled to two (2) second stage combiners/dividers 510 through vias 512. In some examples, the vias 512 can be shorter than the vias of the ports 414. Additionally, the first stage combiner/divider 508 and the second stage combiners/dividers 510 have a cascade arrangement.

The second stage combiners/dividers 510 can be symmetrically arranged relative to the first stage 508. Moreover, in such a situation, BFN cells 502 and a second stage combiner/divider 510 can define a beam forming stage that has a local coordinate system. In this manner, each beam forming stage (a combination of BFN cells 502 and a second stage divider 510) can have the same geometric shape in the local coordinate system. Moreover, each beam forming stage can be rotated in the global coordinate system 404.

Each BFN cell 502 can correspond to an IC chip 520 (or multiple IC chips) that can adjust signals. Each IC chip 520 can be positioned on the bottom layer of the BFN 500. In some examples, each IC chip 520 can be integrated with the BFN 500, and in other examples, each IC chip 520 can be a separate component that communicates with the BFN 500. Each IC chip 520 can be coupled to a combiner/divider 510 and to the N number of ports 414 of the BFN cell 502. As some examples, each IC chip 520 can amplify, phase adjust, combine and/or divide signals.

The BFN 500 can operate in a manner similar to the BFN 200 of FIG. 2. Thus, the BFN 500 can operate in at least one of the transmitting mode and the receiving mode.

As illustrated with the antenna array 400 of FIG. 5 and the BFN 500 of FIG. 6, the antenna cells 402 and the BFN cells 502 can communicate through the N number of ports 414. Moreover, the antenna array 400 can be designed such that the slot elements 408 can be rotated independently from the location of the ports 414. Accordingly, the angle of rotation of the slot elements 408 does not necessarily impact the physical layout of the BFN 500. Therefore, the BFN 500 and the antenna array 400 can be designed independently based on predetermined positions of each of the N number of ports 414 for each BFN cell 502 and each antenna cell 402. Thus, the overall design of the BFN 500 and the antenna array 400 can be simplified.

Figure 7:
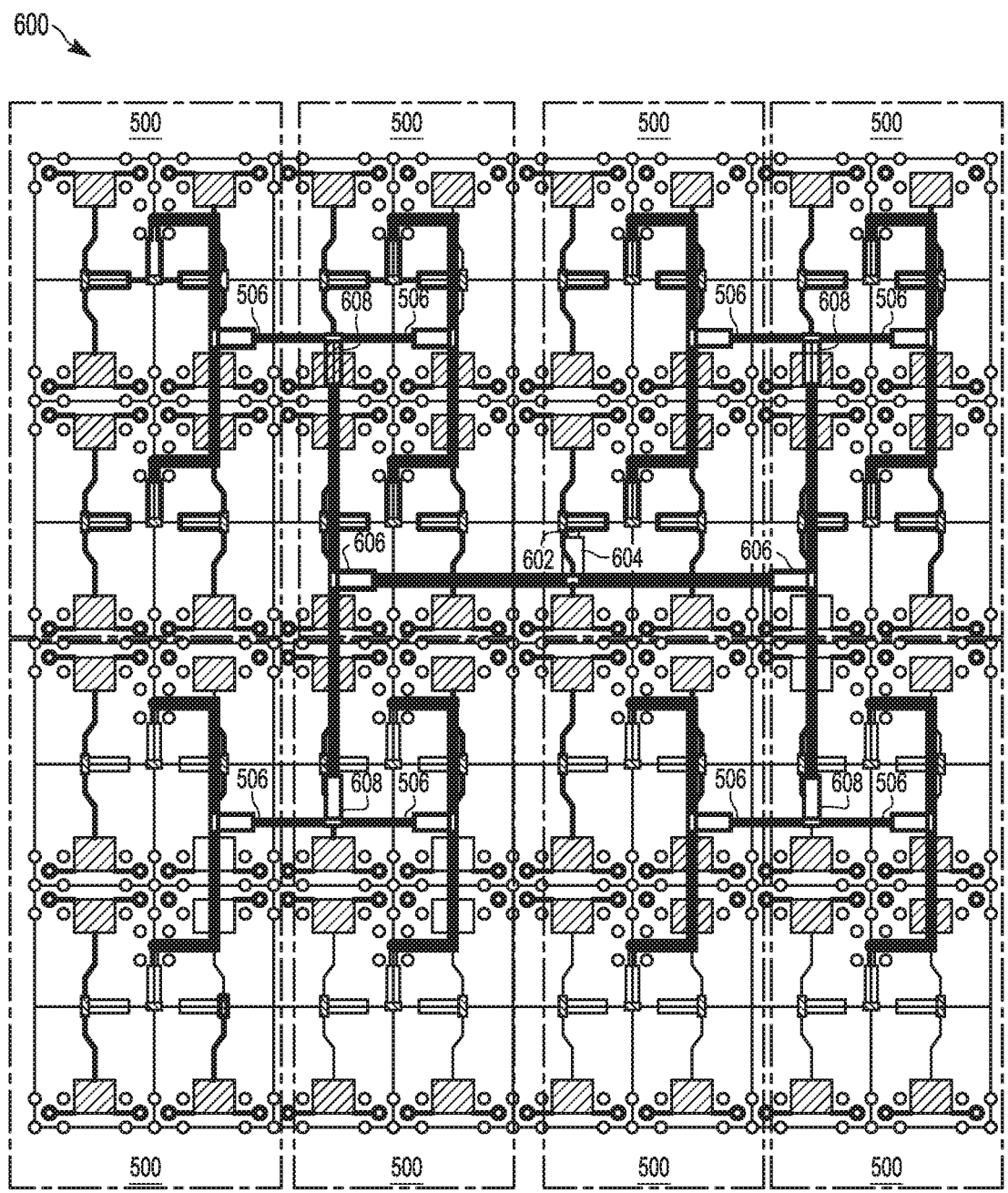
FIG. 7 illustrates another extended plan view of another BFN.

In some examples, the BFN 500 can be designed systematically with symmetric modules that are scalable to accommodate nearly any number of levels. In particular, although the BFN 500 is described with two (2) stages of combiners/dividers, namely the first stage combiner/divider 508 and the second stage of combiners/dividers 510, the BFN 500 illustrated can be employed as a module or circuit to implement a larger scale BFN, including the BFN 600 illustrated in FIG. 7.

In the BFN 600, eight (8) instances of the BFN 500 of FIG. 6 are connected in a cascade (hierarchical) arrangement. In particular, an I/O port 602 is coupled to a first stage combiner/divider 604, which is coupled to two (2) second stage combiners/dividers 606. Each second stage combiner/divider 606 can be coupled to two (2) third stage combiners/dividers 608. Each third stage combiner/divider 608 can be coupled to two instances of an input port 506 of an instance of the BFN 500 (a module of the BFN 600). In this manner, the eight (8) instances of the BFN 600 are connected together in a cascade arrangement. Further, in other examples, multiple instances of the BFN 600 can be coupled in a cascade arrangement.

Figure 8:
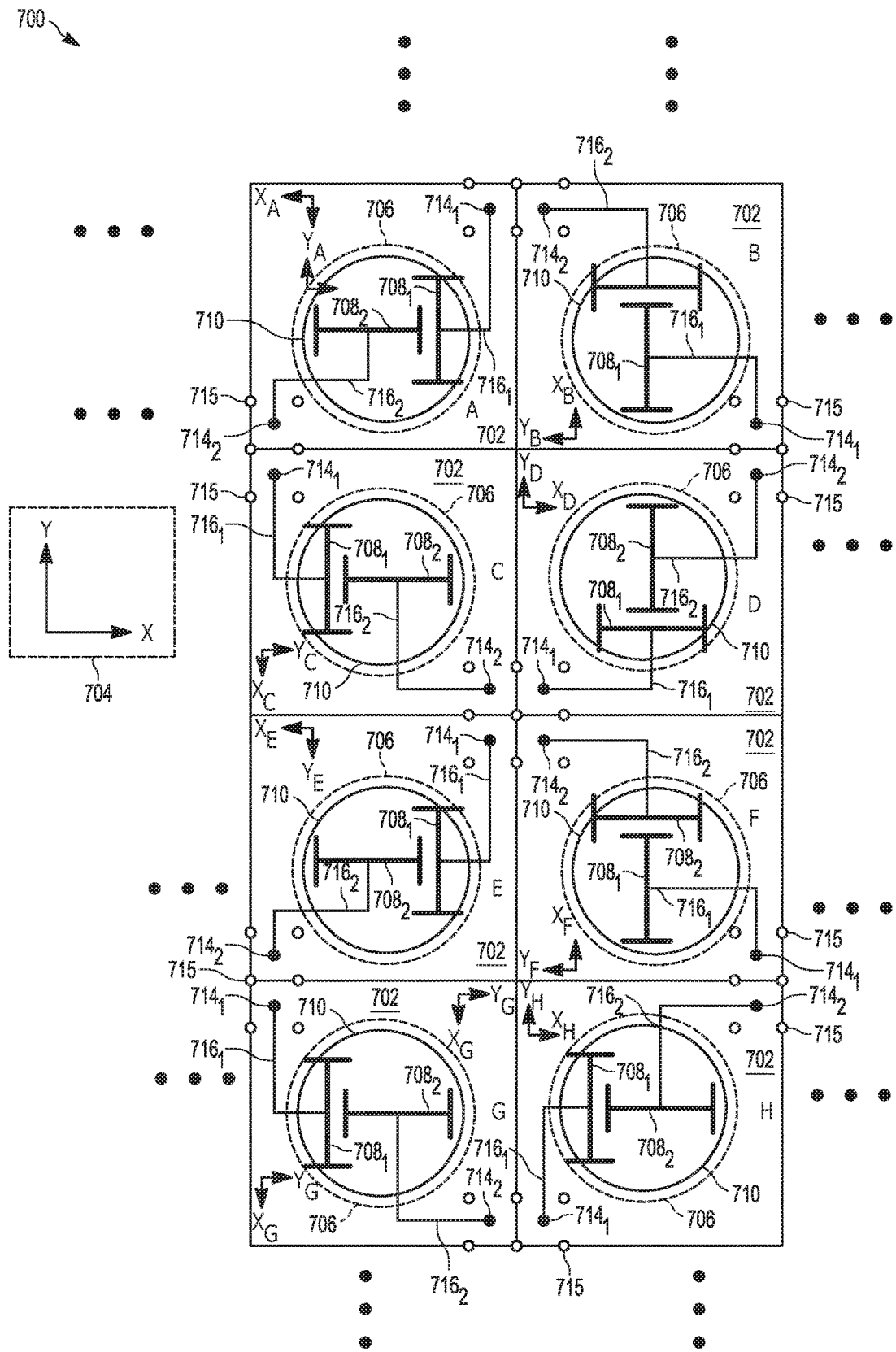
FIG. 8 illustrates plan view of yet another antenna array with a plurality of antenna cells.

FIG. 8 illustrates another plan view of an example of an antenna array 700. The antenna array 700 can be formed on a top layer and/or region of a multi-layer PCB. The antenna array 700 can include a plurality of antenna cells 702 that can be arranged in regular tiling pattern. Each antenna cell 702 can have a square shape. The example illustrated by the antenna array 700 includes eight (8) antenna cells 702, labeled as antenna cells A-H. Each of the plurality of antenna cells 702 can be arranged in a global coordinate system 704. Moreover, each antenna cell 702 can include an instance of a radiating element 706. Each radiating element 706 can include N number of slot elements 708. In the example illustrated, each antenna cell 702 includes two orthogonally positioned slot elements 708, namely a first slot element 7081 and a second slot element 7082. Each radiating element 706 can also include a metallic patch radiator 710.

Each of the N number of slot elements 708 can be rotated in the global coordinate system 704. Additionally, each antenna cell 702 can include a local coordinate system labeled with an origin axis positioned near a corner of each antenna cell 702. Each antenna cell 702 can include N number of ports 714 that couple each respective antenna cell 702 to a BFN that underlays the antenna array 700. In the illustrated example, each antenna cell include two (2) ports 714, namely a first port 7141 and a second port 7142. Additionally, in the example illustrated, each of the first port 7141 and the second port 7142 can be positioned at opposing corners of the antenna cells 702. In other words, the first port 7141 and the second port 7142 are positioned cattycorner relative to each other. Each port 714 can be environed by a plurality of isolation vias 715 spaced equidistant from a corresponding port 714, only some of which are labeled. In the example illustrated, there are four (4) isolation vias 715 in close proximity to each port 714. However, in other examples, there can be more or less isolation vias 715. Moreover, the isolation vias 715 can be shared between ports 714 on different antenna cells 702, thereby reducing the overall number of isolation vias 715 needed to provide sufficient shielding for the ports 714. Additionally, in some examples, some of the isolation vias 715 can extend only partially between the BFN and the antenna array 700.

Each antenna cell 702 can include N number of feedlines 716 formed on a feedline layer. In the example illustrated, there are two (2) feedlines 716 in each antenna cell 702, namely a first feedline 7161 and a second feedline 7162. Each feedline 716 can couple a port 714 with a corresponding slot element 708. In some examples, the first feedline 7161 and the second feedline 7162 within a given antenna cell 702 can have the same length.

Each of the N number of ports 714 in each antenna cell 702 can be positioned at a set of coordinates in a corresponding local coordinate system, which can be the same set of coordinates in each local coordinate system. Accordingly, in some examples, the N number of ports 714 in each antenna cell 702 can intersect the feedline layer at the same set of coordinates in the corresponding local coordinate system. Consequently, the first port 7141 of the antenna cell A 702 can have the same set of coordinates in the corresponding local coordinate system as the first port 7141 of the antenna cell B 702. In this manner, the ports 714 are located at regular positions throughout the antenna array 700.

In some examples, the angle of rotation of each radiating element 706 in the global coordinate system 704 can be 0 degrees, +/−90 degrees, +/−180 degrees and +/−270 degrees. In other examples, other angle of rotations in the global coordinate system 704 are possible. The antenna array 700 can operate in the same (or similar manner) as the antenna array 100 of FIG. 1. Accordingly, each antenna cell 702 of the antenna array 700 can be designed to communicate RF signals with free space. In other words, the antenna array 700 can be designed to at least one of transmit RF signals into free space and receive RF signals from free space. Such communicated signals can be adjusted by a BFN and (in some examples), IC chips, as explained herein.

Figure 9:
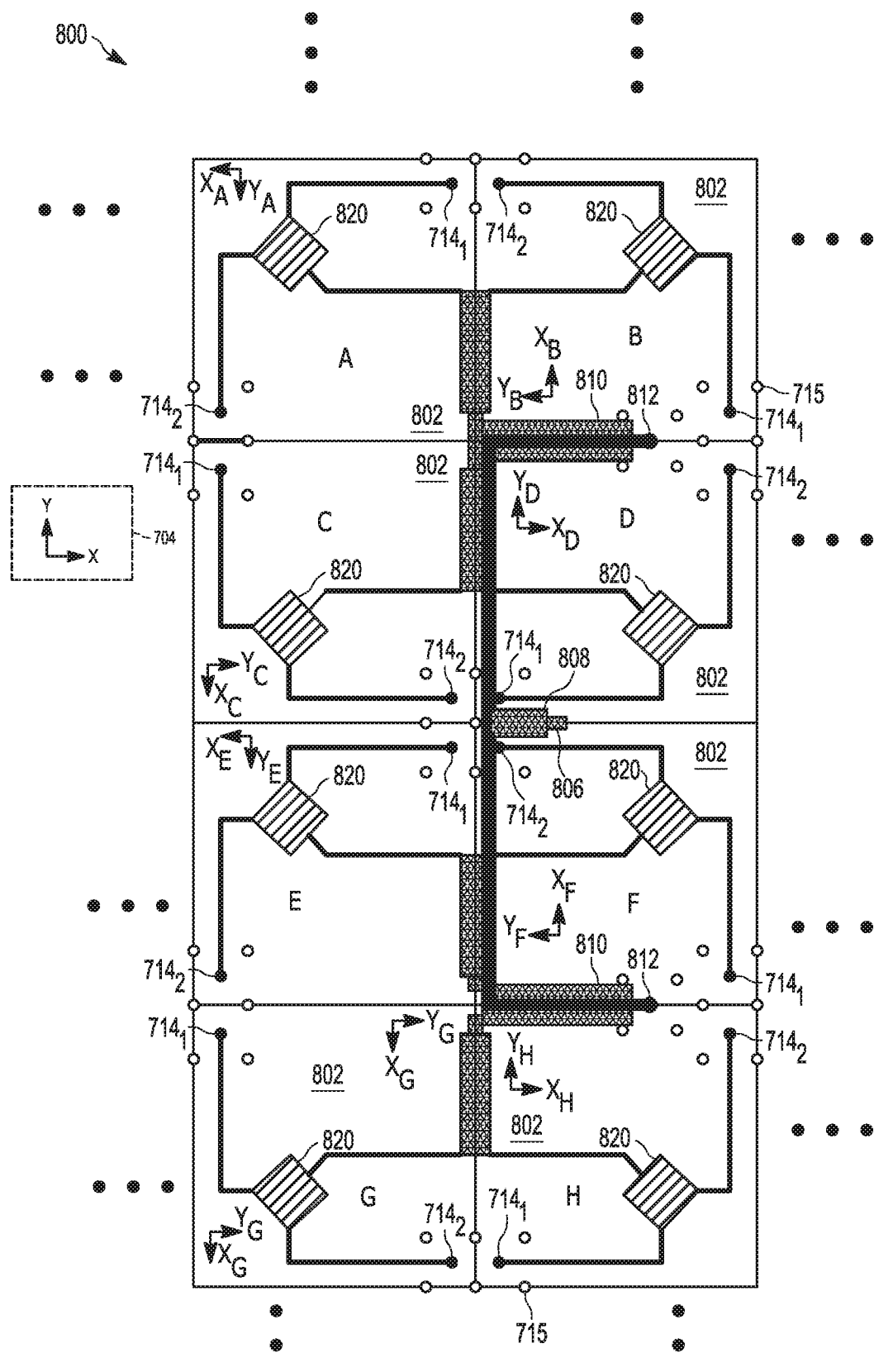
FIG. 9 illustrates a plan view of yet another BFN in communication with the antenna array of FIG. 8.

FIG. 9 illustrates another plan view of an example of a BFN 800 that can be employed to communicate with the antenna array 700 of FIG. 8. Some components of the BFN 800 can be formed on an interior layer of the multi-layer PCB employed for the antenna array 700. Moreover, as explained herein, some components of the BFN 800 can be formed or mounted on an exterior layer (e.g., a bottom layer) of the BFN 800. For purposes of simplification of explanation, the same reference numbers are employed in FIGS. 8 and 9 to denote the same structure. The BFN 800 can be partitioned into a plurality of BFN cells 802 that are each rotated in the global coordinate system 704. As noted, the BFN 800 can underlay the antenna array 700 of FIG. 8. Moreover, each BFN cell 802 can have the same size and shape (e.g., a square) as an overlaying antenna cell 702. Accordingly, the BFN cells 802 are labeled A-H to correspond to the overlaying antenna cell 702. Thus, BFN cell A 802 underlies antenna cell A 702. Each BFN cell 802 can have the same local coordinate system as the corresponding antenna cell 702.

Each BFN cell 802 can include N number of ports 714. In the example illustrated by the BFN 800, each BFN cell includes a first port 7141 and a second port 7142. Each port 714 can be representative of a terminal of a via to a port illustrated in the antenna array 700. Each of the N number of ports 714 can be at a same set of coordinates in each respective local coordinate system. As explained with respect to the antenna array 700, each of the N number of ports 714 can be at a same set of coordinates in each local coordinate system.

Each of the N number of ports 714 can be environed by a plurality of isolation vias 715, only some of which are labeled. The isolation vias 715 can correspond to the isolation vias 715 of FIG. 8. Additionally, in some examples, some of the isolation vias 715 can extend only partially between the BFN 800 and the antenna array 700 of FIG. 8.

The BFN 800 can include an I/O port 806 that can be coupled to an external system. The I/O port 806 can be coupled to a first stage combiner/divider 808, which can be coupled to two (2) second stage combiners/dividers 810 through vias 812. In some examples, the vias 812 can be shorter than the vias of the ports 714. the first stage combiner/divider 808 and the second stage combiners/dividers 810 can have a cascade arrangement.

Each BFN cell 802 can correspond to an IC chip 820 (or multiple IC chips) that can adjust signals. Each IC chip 820 can be positioned on the bottom layer of the BFN 800. In some examples, each IC chip 820 can be integrated with the BFN 800, and in other examples, each IC chip 820 can be a separate component that communicates with the BFN 800. Each IC chip 820 can be coupled to a second stage combiner/divider 810 and to the N number of ports 714 of the BFN cell 802. Each IC chip 820 can amplify, phase adjust, combine and/or divide signals.

The second stage combiners/dividers 810 can be symmetrically arranged relative to the first stage 808. Moreover, in such a situation, BFN cells 802 and a second stage combiner/divider 810 can define a beam forming stage that has a local coordinate system. In this manner, each beam forming stage (a combination of BFN cells 802 and a second stage combiner/divider 810) can have the same geometric shape in the local coordinate system. Moreover, each beam forming stage can be rotated in the global coordinate system 704.

The BFN 800 can operate in a manner similar to the BFN 200 of FIG. 2. Thus, the BFN 800 can operate in at least one of the transmitting mode and the receiving mode.

As illustrated with the antenna array 700 of FIG. 8 and the BFN 800 of FIG. 9, the antenna cells 702 and the BFN cells 802 can communicate through the N number of ports 714. Moreover, the antenna array 700 can be designed such that the slot elements 708 can be rotated independently from the location of the ports 714. Accordingly, the angle of rotation of the slot elements 708 does not necessarily impact the physical layout of the BFN 800. Therefore, the BFN 800 and the antenna array 700 can be designed independently based on predetermined positions of each of the N number of ports 714 for each BFN cell 802 and each antenna cell 702. Thus, the overall design of the BFN 800 and the antenna array 700 can be simplified.

Figure 10:
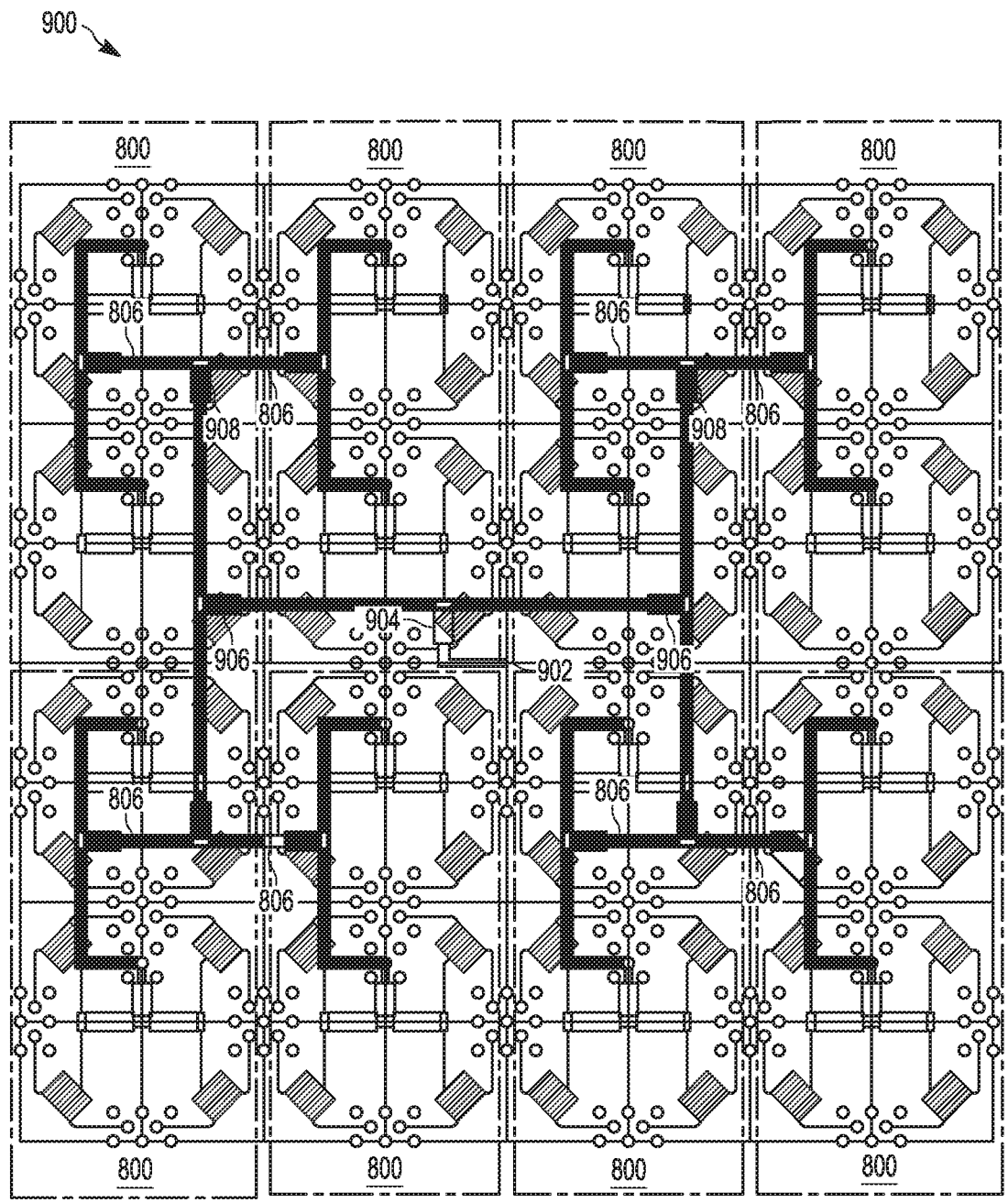
FIG. 10 illustrates an extended plan view of yet another BFN.

In some examples, the BFN 800 can be designed systematically with symmetric modules that are scalable to accommodate nearly any number of levels. In particular, although the BFN 800 is described with two (2) stages of combiners/dividers, namely the first stage combiner/divider 808 and the second stage combiners/dividers 810, the BFN 800 illustrated can be employed as a module or circuit to implement a larger scale BFN, including the BFN 900 illustrated in FIG. 10.

In the BFN 900, eight (8) instances of the BFN 800 of FIG. 9 are connected in a cascade (hierarchical) arrangement. In particular, an I/O port 902 is coupled to a first stage combiner/divider 904, which can each be coupled to two (2) second stage combiners/dividers 906. Each second stage combiner/divider 906 can be coupled to two (2) third stage combiners/dividers 908. Each third stage combiner/divider 908 can be coupled to two instances of an input port 806 of an instance of the BFN 800 (a module of the BFN 900). In this manner, the eight (8) instances of the BFN 900 are connected together in a cascade arrangement. Further, in other examples, multiple instances of the BFN 900 can be coupled in a cascade arrangement.

Figure 11:
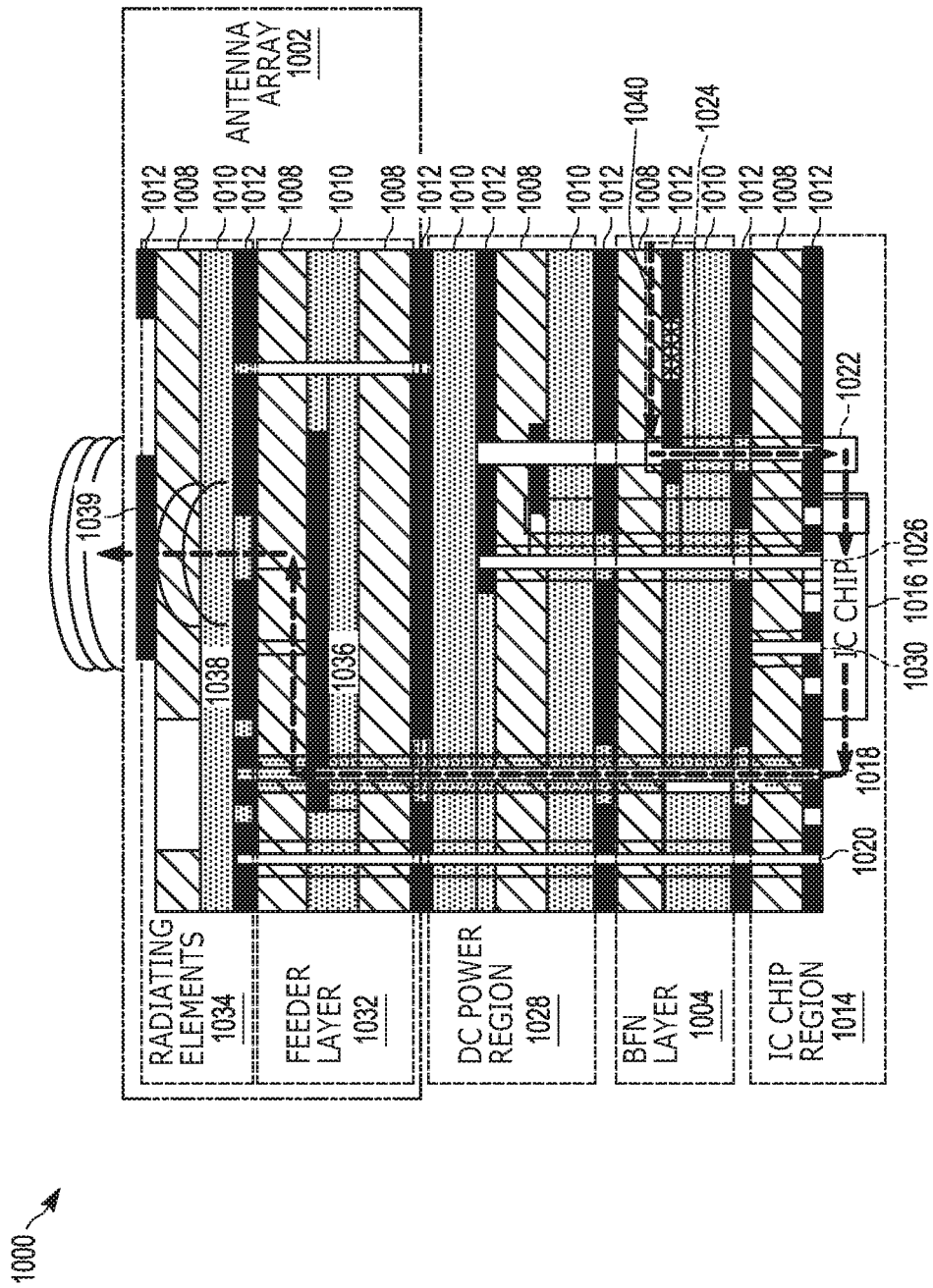
FIG. 11 illustrates a stack-up view of a multi-layer printed circuit board for implementing a system with an antenna array and a BFN.

FIG. 11 illustrates a stack-up (cross-sectional) view of a multi-layer PCB 1000 (or other dielectric substrate) that can include an antenna array 1002 overlaying a BFN 1004 formed on a BFN layer. The multi-layer PCB 1000 can be employed to implement a system that can at least one of transmit and receive RF signals. The antenna array 1002 can be implemented, for example, with the antenna array 100 of FIG. 1, the antenna array 400 of FIG. 5 or the antenna array 700 of FIG. 8. The BFN 1004 formed on the BFN layer can have a plurality of traces (e.g., conductive traces). The BFN 1004 can be implemented, for example, as the BFN 200 of FIG. 2, the BFN 300 of FIG. 3, a portion of the BFN array 320 of FIG. 4, the BFN 500 of FIG. 6, the BFN 600 of FIG. 7, the BFN 800 of FIG. 9 or the BFN 900 of FIG. 10. In FIG. 11, a portion of the multi-layer PCB 1000 is included. The multi-layer PCB 1000 can include core material (e.g., dielectric laminate) layers 1008, pre-preg material (a pre-impregnated material, such as an epoxy-based material) layers 1010 and conductive material (e.g., ground plane) layers 1012.

An IC chip region 1014 can include layers for mounting an IC chip 1016 onto a lower surface of the BFN 1004. The IC chip 1016 can be implemented, for example, as an instance of the IC chip 220 of FIG. 2, the IC chip 520 of FIG. 6 or the IC chip 820 of FIG. 9. The multi-layer PCB 1000 can include a port 1018 implemented as a via that communicatively couples the IC chip 1016 to the antenna array 1002. The multi-layer PCB 1000 can also include an isolation via 1020 that provides shielding for the port 1018. The IC chip region 1014 can communicate with the BFN 1004 through a via 1022 that communicatively couples a combiner/divider that can be formed on a bottom (exterior) layer of the BFN 1004 to the IC chip 1016. The combiner/divider can be implemented, for example, as the 3-to-1 combiner/divider 212 of FIG. 2, the second stage combiner/divider 510 of FIG. 6 or the second stage combiner divider 810 of FIG. 9. Additionally, the IC chip 1016 can be connected to a power supply through a via 1026 that can couple the IC chip 1016 to direct current (DC) power supply region 1028 of the multi-layer PCB 1000. Further, the IC chip 1016 can be connected to an electrically neutral node (e.g., ground) through a via 1030.

A feeder layer 1032 of the antenna array 100 can underlay radiating elements 1034 of the antenna array 1002. The feeder layer 1032 can include an instance of a feedline 1036. The feed line 1036 can couple the port 1018 to a slot element 1038 of the radiating elements 1034. The slot element 1038 can be electromagnetically coupled to a patch antenna 1039 of the radiating elements 1034.

FIG. 11 includes an arrow representing a signal 1040 flowing through the multi-layer PCB 1000 operating in the transmitting mode. The signal 1040 can be provided, for example, as an electrical signal (a guided EM signal) from an external system. The signal 1040 traverses the combiner/divider 1024 and is provided to the IC chip 1016 through the via 1022. The IC chip 1016 can adjust (e.g., amplify, phase adjust and/or divide) the signal 1040. Moreover, the signal 1040 can be provided to the port 1018, and the signal 1040 is received at the antenna array 1002. The signal 1040 can be provided to the slot element 1038 through the feedline 1036. The slot element 1038 can convert a guided EM signal into a radiated EM signal that is transmitted by the patch antenna 1039 into free space. In the receiving mode, signals operate in reverse of the signal 1040.

Figure 12:
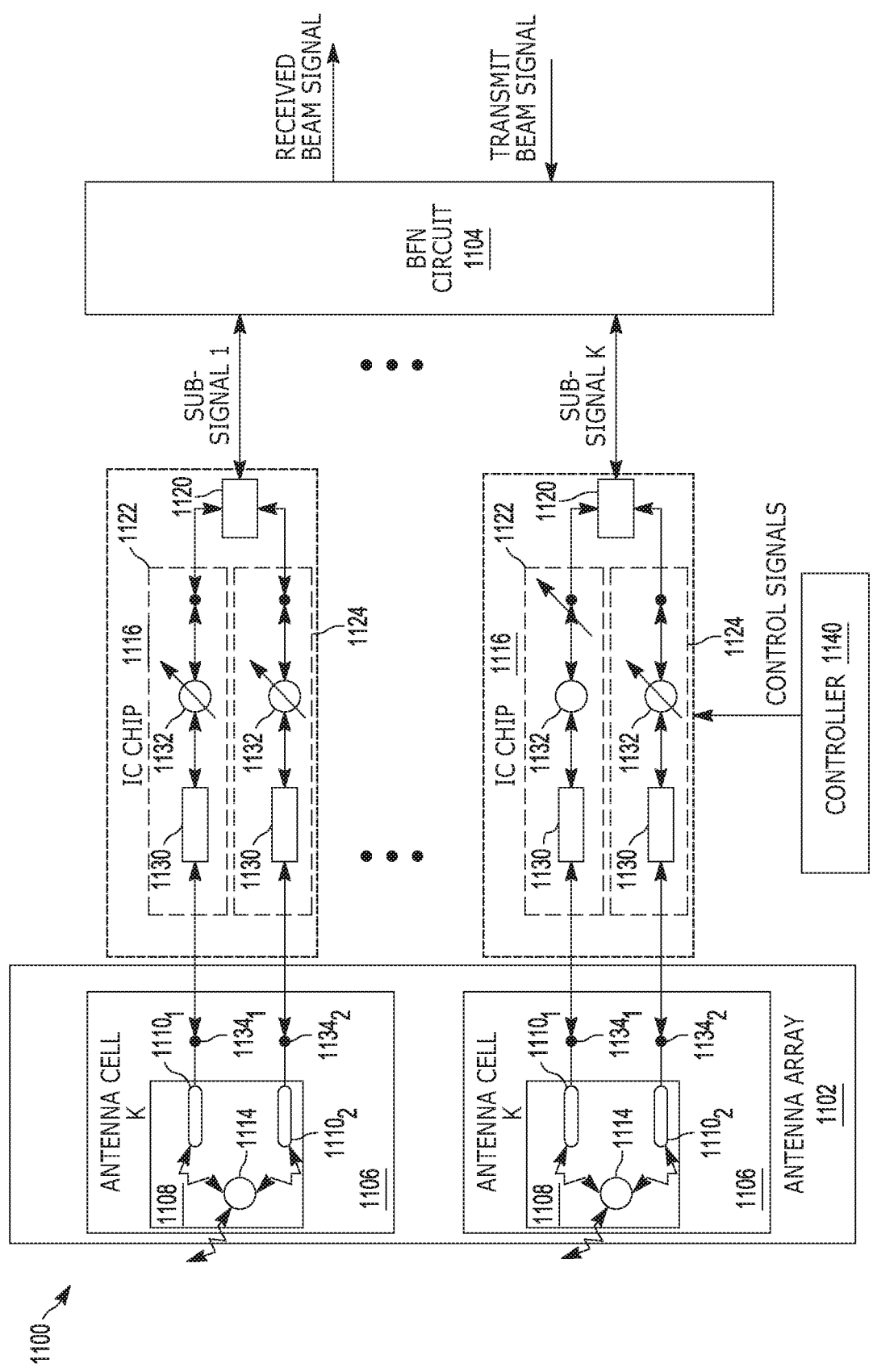
FIG. 12 illustrates a block diagram of a system that implements an antenna array and a BFN.

FIG. 12 illustrates a block diagram of a system 1100 that depicts the logical interconnection of an antenna array 1102 and a BFN 1104. The antenna array 1002 can be implemented, for example, with the antenna array 100 of FIG. 1, the antenna array 400 of FIG. 5 or the antenna array 700 of FIG. 8. The BFN 1004 can be implemented, for example, as the BFN 200 of FIG. 2, the BFN 300 of FIG. 3, the BFN 500 of FIG. 6, the BFN 600 of FIG. 7, the BFN 800 of FIG. 9 or the BFN 900 of FIG. 10.

In some examples, the antenna array 1102 can operate exclusively in the transmitting mode or the receiving mode. In other examples, the antenna array 1102 can operate in a half-duplexing mode, wherein the antenna array 1102 switches between the receiving mode and the transmitting mode. In still other examples, the antenna array 1102 can operate in a full-duplexing mode, wherein the antenna array 1102 operates concurrently in the receiving mode and the transmitting mode.

In the illustrated example, K number of antenna cells 1106 communicate with the BFN 1104, where K is an integer greater than or equal to two (2). Each of the K number of antenna cells 1106 can include a radiating element 1108. The radiating element 1108 can be representative of N number of orthogonally arranged slot elements 1110 and a patch antenna 1114. In the example illustrated there are two slot elements 1110, namely a first slot element $1110_1$ and a second slot element $1110_2$. Each of the K number of antenna cells 1106 can communicate with a corresponding IC chip 1116. In the illustrated example, each IC chip 1116 can include a combiner/divider 1120 that can combine and/or divide signals traversing the IC chip 1116. Additionally, each IC chip 1116 can include N number of paths for communicating with the N number of slot elements 1110 of the corresponding antenna cell 1106. In the present example, each IC chip 1116 can include a first path 1122 and a second path 1124. Additionally, in some examples, the first path 1122 and the second path 1124 of each IC chip 1116 can be representative of multiple paths that can be further subdivided into a receiving path and a transmitting path.

The first path 1122 and the second path 1124 can each include an amplifier 1130 and a phase shifter 1132 for adjusting signals communicated with the corresponding radiating element 1108 and/or the BFN 1104.

The first path 1122 can be coupled to a first port 1134₁ of the corresponding antenna cell 1106 and the second path 1124 can be coupled to a second port 1134₂ of the corresponding antenna cell 1106. The first port 1134₁ of the antenna cell 1106 can be designed to communicate signals between the first path 1122 of the IC chip 1116 and the first slot element 1110₁ that are in a first polarization. The second port 1134₂ of the antenna cell 1106 can be designed to communicate signals between the second slot element 1110₂ with a second polarization, orthogonal to the first polarization. For instance, the first polarization can be horizontal polarization and the second polarization can be vertical polarization, or vice versa. In such a situation, the antenna array 1102 can communicate signals with right hand circular polarization (RHCP) or left hand circular polarization (LHCP). Alternatively, in some examples, there can be only one slot element 1110, and the polarization can be a linear polarization.

The IC chips 1116 can receive control signals from a controller 1140 that can be implemented on an external system. In some examples, the controller 1140 can be implemented as a microcontroller with embedded instructions. In other examples, the controller 1140 can be implemented as a general-purpose computer with software executing thereon. In some examples, the control signals can control mode of operation of the system 1100. That is, in some examples, the control signals can cause the IC chips 1116 to switch the antenna array 1102 from the receiving mode to the transmitting mode, or vice-versa. Additionally, in some examples, the control signals provided from the controller 1140 can control a variable amount of amplitude adjustment applied by each amplifier 1130. Thus, in some examples, each amplifier 1130 can be implemented as a variable gain amplifier, a switched attenuator circuit, etc. Similarly, in some examples, the control signals provided from the controller 1140 can control a variable amount of phase adjustment applied by each phase shifter 1132.

During operation in the receiving mode, the controller 1140 can cause the IC chips 1116 to route signals from the K number of antenna cells 1106 to the BFN 1104. Moreover, in the receiving mode, an EM signal (an RF signal) in the first polarization can be received at the patch antenna 1114 and detected by the first slot elements 1110₁ by each of the K number of antenna cells 1106 (or some subset thereof). Similarly, an EM signal (RF) in the second polarization can be received at the patch antenna 1114 and detected by the second slot element 1110₂. Each of the first slot elements 1110₁ and the second slot elements 1110₂ can convert the received EM signals into an electrical signal that can be provided to a corresponding IC chip 1116 for adjustment. Signals provided from the first slot element 1110₁ can be provided to the first path to the IC chip 1116 and signals provided from the second slot element 1110₂ can be provided to the second path 1124 of the IC chip 1116.

Continuing in the receiving mode, each amplifier 1130 in the first path 1122 of the IC chips 1116 can amplify the signal provided from the first slot element 1110₁ and each phase shifter 1132 of the first path 1122 can apply a phase adjustment to output a signal to the combiner/divider 1120. Similarly, each amplifier 1130 in the second path 1124 of the IC chips 1116 can amplify the signal provided from the second slot element 1110₂ and each phase shifter 1132 of the second path 1124 can apply a phase adjustment to output a signal to the combiner/divider 1120. Each combiner/divider 1120 can combine a signal from the first path 1122 with a signal from the second path 1124, such that the K number of IC chips 1116 can output K number of sub-signals. The K number of sub-signals can be provided to the BFN 1104. The BFN 1104 can combine the K number of sub-signals to form a received beam signal that can be provided to the external system for demodulating and processing.

During operation in the transmitting mode, the controller 1140 can set the IC chips 1116 to provide a signal from the BFN 1104 to the K number of antenna cells 1106. The K number of antenna cells 1106 can thus transmit a transmit beam signal that can be provided from the external system to the BFN 1104. The BFN 1104 can divide the transmit beam signal into K number of sub-signals that can be provided to the K number of IC chips 1116. Each IC chip 1116 of the K number of IC chips 1116 can adjust a corresponding sub-signal to generate an adjusted signal that can be provided to a corresponding antenna cell 1106. In the example illustrated, the adjusting can include dividing the corresponding sub-signal into a first signal and a second signal.

The first signal can be provided on the first path 1122 of the IC chip 1116 and the second signal can be provided on the second path 1124 of the IC chip 1116. The phase shifter 1132 of the first path 1122 can apply a phase adjustment to the first signal and the amplifier 1130 of the first path 1122 can amplify the first signal. The first signal can be provided to the first slot element 1110₁. The first slot element 1110₁ can convert the first signal into an EM signal (an RF signal) in the first polarization that can be transmitted to the patch antenna 1114. Similarly, the phase shifter 1132 of the second path 1124 can apply a phase adjustment to the second signal and the amplifier 1130 of the second path 1124 can amplify the second signal. The second signal can be provided to the second slot element 1110₂. The second slot element 1110₂ can convert the second signal into an EM signal (an RF signal) in the second polarization that can be transmitted to the patch antenna 1114. The patch antenna 1114 can transmit the EM signal in the first polarization and the EM signal in the second polarization into free space.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An antenna array comprising:
   a plurality of antenna cells positioned in a global coordinate system of the antenna array, wherein each of the plurality of antenna cells has a respective local coordinate system and comprises:
      a radiating element having a predetermined angle of rotation defined in the global coordinate system; and an antenna port coupled to the radiating element, the antenna port being positioned at a particular set of coordinates in the respective local coordinate system;

wherein the particular set of coordinates of the antenna port of each of the plurality of antenna cells are the same; and wherein the predetermined angle of rotation of the radiating element of a first antenna cell of the plurality of antenna cells is a first rotation angle in the global coordinate system, and the predetermined angle of rotation of the radiating element of a second antenna cell of the plurality of antenna cells is a second rotation angle in the global coordinate system, the second rotation angle different than the first rotation angle.

2. The antenna array of claim 1, wherein the antenna port of each of the plurality of antenna cells is a first antenna port and each of the plurality of antenna cells further comprises a second antenna port, the second antenna port being positioned at a second set of coordinates in the respective local coordinate system, wherein the second antenna port of each of the plurality of antenna cells is positioned at the same second set of coordinates in each respective local coordinate system.

3. The antenna array of claim 2, wherein the first antenna port and the second antenna port of each of the plurality of antenna cells communicate signals that have a phase difference of 90 degrees.

4. The antenna array of claim 1, wherein the second antenna cell is rotated in the global coordinate system relative to the first antenna cell.

5. The antenna array of claim 4, wherein the radiating element of the first antenna cell of the plurality of antenna cells has a first local predetermined angle of rotation in the local coordinate system of the first antenna cell and the radiating element of the second antenna cell of the plurality of antenna cells has a second local predetermined angle of rotation in the local coordinate system of the second antenna cell, the second local predetermined angle of rotation being offset from the first local predetermined angle of rotation by a predetermined angle in the local coordinate system of the first antenna cell and the local coordinate system of the second antenna cell.

6. The antenna array of claim 1, wherein a third antenna cell of the plurality of antenna cells is rotated in the global coordinate system relative to the first antenna cell of the plurality of antenna cells and a radiating element of the third antenna cell and the radiating element of the first antenna cell are not rotated relative to each other in the global coordinate system.

7. The antenna array of claim 1, wherein the antenna port of each of the plurality of antenna cells comprises a via that is coupled to a beam-forming network (BFN).

8. The antenna array of claim 7, wherein the BFN comprises a plurality of combiners/dividers that convert between an input/output signal and a plurality of sub-signals, wherein each of the plurality of sub-signals is communicated to an antenna port of a respective antenna cell of the plurality of antenna cells through an integrated circuit (IC) chip.

9. The antenna array of claim 1, wherein the antenna port of each of the plurality of antenna cells is a signal interface for communicating signals between the antenna cell and an integrated circuit (IC) chip coupled to a beam-forming network (BFN).

10. The antenna array of claim 1, wherein each of the plurality of antenna cells further comprises a feedline that couples a corresponding radiating element and antenna port of a respective antenna cell, wherein a length of each respective feedline of the plurality of antenna cells is the same.

11. The antenna array of claim 10, wherein a third antenna cell of the plurality of antenna cells is rotated in the global coordinate system relative to the first antenna cell of the plurality of antenna cells and a radiating element of the third antenna cell and the radiating element of the first antenna cell are not rotated relative to each other in the global coordinate system.

12. The antenna array of claim 1, wherein the particular set of coordinates for each of the plurality of antenna cells is located between a respective radiating element and a perimeter of a respective antenna cell.

13. The antenna array of claim 1, further comprising a plurality of isolation vias, wherein a given isolation via of the plurality of isolation vias is shared between an antenna port of at least three of the plurality of antenna cells.

14. The antenna array of claim 1, wherein the antenna port of each of the plurality of antenna cells is coupled to a beam-forming network (BFN) wherein the BFN comprises a plurality of beam forming stages, wherein each of the plurality of beam forming stages has a respective local coordinate system, and each of the plurality of beam forming stages has the same geometric shape in the respective local coordinate system; and wherein a given beam forming stage of the plurality of beam forming stages has the same geometric shape as another beam forming stage of the plurality of beam forming stages, wherein the given beam forming stage and the other beam forming stage are the same stage, and the given beam forming stage is rotated in the global coordinate system relative to the other beam forming stage.

15. The antenna array of claim 1, wherein the plurality of antenna cells are arranged in a plurality of groups of antenna cells each comprises a group rotation pattern that defines a predetermined angle of rotation in the global coordinate system for each radiating element in a respective group of antenna cells.

16. The antenna array of claim 15, wherein the group rotation pattern for adjacent groups of antenna cells is different.

17. The antenna array of claim 1, wherein the radiating element of six of the plurality of antenna cells has a different angle of rotation in the global coordinate system.

18. A multi-layer printed circuit board (PCB) comprising:
a beam-forming layer having a plurality of traces that form a beam-forming network (BFN), wherein the beam-forming network is coupled to a plurality of antenna ports forming vias extending away from the beam-forming network (BFN), the BFN comprises:
a plurality of combiners/dividers that convert between an input/output signal and a plurality of sub-signals, wherein each of the plurality of sub-signals has an equal power and an array of phases, wherein each of the plurality of sub-signals is communicated to an antenna port of the plurality of antenna ports;
a plurality of antenna cells being positioned in a global coordinate system of the multi-layered PCB to form a regular tiling pattern, wherein each of the plurality of antenna cells has a respective local coordinate system and comprises:
a radiating layer comprising a radiating element that has a predetermined angle of rotation in the global coordinate system; and a feedline layer having a feedline that couples a corresponding antenna port of the plurality of antenna ports to the radiating element, wherein each antenna port intersects with the feedline layer at a particular set of coordinates in the respective local coordinate system;

wherein the particular set of coordinates for each of the plurality of antenna cells are the same; and wherein the predetermined angle of rotation of the radiating element of a first antenna cell of the plurality of antenna cells is a first rotation angle in the global coordinate system, and the predetermined angle of rotation of the radiating element of a second antenna cell of the plurality of antenna cells is a second rotation angle in the global coordinate system, the second rotation angle different than the first rotation angle.

19. The multi-layered PCB of claim 18, wherein the plurality of combiners/dividers of the BFN are arranged in a plurality of beam forming stages, wherein each of the plurality of beam forming stages has a respective local coordinate system, and each of the plurality of beam forming stages has the same geometric shape in the respective local coordinate system; and wherein a given beam forming stage of the plurality of beam forming stages has the same geometric shape as another beam forming stage of the plurality of beam forming stages, wherein the given beam forming stage and the other beam forming stage are the same stage, and the given beam forming stage is rotated in the global coordinate system relative to the other beam forming stage.

20. The multi-layered PCB of claim 18, wherein each of the plurality of beam forming stages correspond to a first circuit and a second circuit, wherein the first circuit and the second circuit amplify and phase shift a signal communicated between a respective beam forming stages and a corresponding radiating element of a respective antenna cell of the plurality of antenna cells.

* * * * *